(12) United States Patent
Kasahara

(10) Patent No.: US 9,639,988 B2
(45) Date of Patent: May 2, 2017

(54) INFORMATION PROCESSING APPARATUS AND COMPUTER PROGRAM PRODUCT FOR PROCESSING A VIRTUAL OBJECT

(71) Applicant: SONY CORPORATION, Minato-ku (JP)

(72) Inventor: Shunichi Kasahara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 79 days.

(21) Appl. No.: 14/353,379

(22) PCT Filed: Jan. 29, 2013

(86) PCT No.: PCT/JP2013/000461
§ 371 (c)(1),
(2) Date: Apr. 22, 2014

(87) PCT Pub. No.: WO2018/118458
PCT Pub. Date: Aug. 15, 2013

(65) Prior Publication Data
US 2014/0313228 A1    Oct. 23, 2014

(30) Foreign Application Priority Data

Feb. 10, 2012   (JP) .................................. 2012-026872

(51) Int. Cl.
*G06T 19/00*  (2011.01)
*G06F 1/16*   (2006.01)
*G06F 3/00*   (2006.01)
*G06F 3/01*   (2006.01)

(52) U.S. Cl.
CPC .......... *G06T 19/006* (2013.01); *G06F 1/1694* (2013.01); *G06F 3/005* (2013.01); *G06F 3/011* (2013.01)

(58) Field of Classification Search
None
See application file for complete search history.

(56) References Cited

U.S. PATENT DOCUMENTS

| 7,965,294 | B1* | 6/2011 | Milliron | G06T 13/00 345/473 |
| 2005/0206654 | A1* | 9/2005 | Vaha-Sipila | G01C 21/20 345/632 |
| 2008/0307364 | A1* | 12/2008 | Chaudhri | G06F 3/0483 715/836 |
| 2010/0194782 | A1* | 8/2010 | Gyorfi | H04W 4/00 345/633 |

(Continued)

OTHER PUBLICATIONS

International Search Report issued Jun. 5, 2013 in PCT/JP2013/000461.

(Continued)

*Primary Examiner* — Vu Nguyen
(74) *Attorney, Agent, or Firm* — Oblon, McClelland, Maier & Neustadt, L.L.P.

(57) ABSTRACT

An information processing apparatus and non-transitory computer readable medium cooperate to provide a control unit having circuitry configured to receive an indication of a detected posture of the information processing apparatus, and attach a virtual object to a reference environment with a posture related to the detected posture of the information processing apparatus.

19 Claims, 28 Drawing Sheets

(56) References Cited

U.S. PATENT DOCUMENTS

| | | | |
|---|---|---|---|
| 2011/0090252 A1* | 4/2011 | Yoon | G06T 7/2033 |
| | | | 345/633 |
| 2011/0140994 A1 | 6/2011 | Noma | |
| 2011/0216002 A1 | 9/2011 | Weising et al. | |
| 2011/0216060 A1 | 9/2011 | Weising et al. | |
| 2011/0298823 A1* | 12/2011 | Kitahara | G06T 19/006 |
| | | | 345/632 |
| 2012/0105474 A1* | 5/2012 | Cudalbu | H04W 4/02 |
| | | | 345/633 |
| 2012/0122491 A1* | 5/2012 | Kim | H04L 67/22 |
| | | | 455/456.3 |
| 2012/0194547 A1* | 8/2012 | Johnson | G06T 11/00 |
| | | | 345/632 |
| 2013/0044130 A1* | 2/2013 | Geisner | G09G 5/00 |
| | | | 345/633 |
| 2013/0194164 A1* | 8/2013 | Sugden | G02B 27/017 |
| | | | 345/8 |
| 2013/0307875 A1* | 11/2013 | Anderson | G06T 19/006 |
| | | | 345/633 |

OTHER PUBLICATIONS

International Preliminary Report on Patentability issued May 19, 2014 in PCT/JP2013/000461.
Anders Henrysson et al., "Virtual Object Manipulation using a Mobile Phone", ACM, XP-040046358, Dec. 5, 2005, pp. 164-171.
Anton van den Hengel et al., "In Situ Image-based Modeling",$8^{th}$ IEEE International Symposium on Mixed and Augmented Reality, XP-031568930, Oct. 19, 2009, pp. 107-110.
Daniel Wagner et al., "Pose Tracking from Natural Features on Mobile Phones", $7^{th}$ IEEE International Symposium on Mixed and Augmented Reality, XP-031343987, Sep. 15, 2008, 10 pages.

* cited by examiner $M_0$ : POSITION AND ATTITUDE OF TERMINAL (UNIT MATRIX)

$M_{recog}$ : POSITION AND ATTITUDE OF ENVIRONMENT WITH RESPECT TO $M_0$ (ENVIRONMENT RECOGNITION MATRIX)

Fig. 7

| REFERENCE ENVIRONMENT | OBJECT ID | ARRANGEMENT | TIME |
|---|---|---|---|
| En1 | $V_{O1}$ | $M_{arrange}(t1)$ | t1 |
| En1 | $V_{O2}$ | $M_{arrange}(t2)$ | t2 |
| ⋮ | ⋮ | ⋮ | ⋮ |

OBJECT ARRANGEMENT DATA

| REFERENCE ENVIRONMENT | OBJECT ID | CREATOR ID | ARRANGEMENT |
|---|---|---|---|
| En4 | $V_{A1}$ | $U_A$ | $M_{arrange}(V_{A1})$ |
| En4 | $V_{A2}$ | $U_A$ | $M_{arrange}(V_{A2})$ |
| En4 | $V_{B1}$ | $U_B$ | $M_{arrange}(V_{B1})$ |
| : | : | : | : |

OBJECT ARRANGEMENT DATA

| OBJECT ID | DISPLAY ATTRIBUTE DATA | ASSOCIATED INFORMATION |||
|---|---|---|---|---|
| | | USER DATA | STATUS | DEVICE DATA |
| $V_{A1}$ | ... | ... | ... | ... |
| $V_{A2}$ | ... | ... | ... | ... |
| $V_{B1}$ | ... | ... | ... | ... |
| : | : | : | | : |

OBJECT DATA

INFORMATION PROCESSING APPARATUS AND COMPUTER PROGRAM PRODUCT FOR PROCESSING A VIRTUAL OBJECT

TECHNICAL FIELD

The present disclosure relates to an image processing device, and a computer program product.

BACKGROUND ART

In recent years, a technology called augmented reality (AR) has been drawing attention in which a real world with additional information overlaid thereon is presented to a user. Information presented to a user in the AR technology is also called an annotation, and can be visualized using virtual objects in various forms such as text, icons, or animations. In the existing AR technology, a developer of an AR application mainly plays a role in arranging virtual objects in the AR space. The developer determines which virtual object should be arranged in what position and in what attitude in the AR space. The thus determined arrangement of the virtual object is stored as data in association with a given environment (e.g., a specific space, place, real object, or a collection of real objects in the real space). Consequently, an AR application is realized in which when an end user captures an image of the environment using an imaging device, a virtual object associated with the environment is overlaid on the captured image.

Patent Literature 1 below shows an example of a technology for modeling a real space in a stage before a virtual object is arranged. Patent Literature 2 below shows an example of a technology that uses a natural marker with the objective of calculating the position and the attitude of an imaging device that are needed for overlaying a virtual object on a captured image.

CITATION LIST

Non Patent Literature

NPL 1: A. van den Hengel, R. Hill, B. Ward and A. Dick, "In Situ Image-based Modeling" (In Proc. 8th IEEE International Symposium on Mixed and Augmented Reality, 2009)

NPL 2: W. Daniel, G. Reitmayr, A. Mulloni, T. Drummond, and D. Schmalstieg, "Pose Tracking from Natural Features on Mobile Phones" (In Proc. 7th IEEE International Symposium on Mixed and Augmented Reality, 2008)

SUMMARY

Technical Problem

However, with the existing AR technology, it has been difficult for those other than developers of AR applications who have specialized knowledge, for example, to adequately arrange a virtual object in the AR space. In contrast, if it becomes possible for general users without special knowledge to freely and easily arrange a virtual object in the AR space and view and share the virtual object, the range of the AR application would increase and thus more users would be able to enjoy the advantages of the AR technology.

Thus, the technology according to the present disclosure provides a mechanism with which a virtual object can be freely and easily arranged in the AR space.

Solution to Problem

An information processing apparatus and non-transitory computer readable medium cooperate to provide a control unit having circuitry configured to receive an indication of a detected posture of the information processing apparatus, and attach a virtual object to a reference environment with a posture related to the detected posture of the information processing apparatus.

Advantageous Effects of Invention

The technology according to the present disclosure provides a mechanism with which a virtual object can be easily and freely arranged in the AR space.

BRIEF DESCRIPTION OF DRAWINGS

FIG. 7 is an explanatory diagram illustrating a basic configuration example of object arrangement data.

FIG. 23 is an explanatory diagram illustrating an example of object arrangement data.

FIG. 24 is an explanatory diagram illustrating an example of object data.

DESCRIPTION OF EMBODIMENTS

Figure 1:
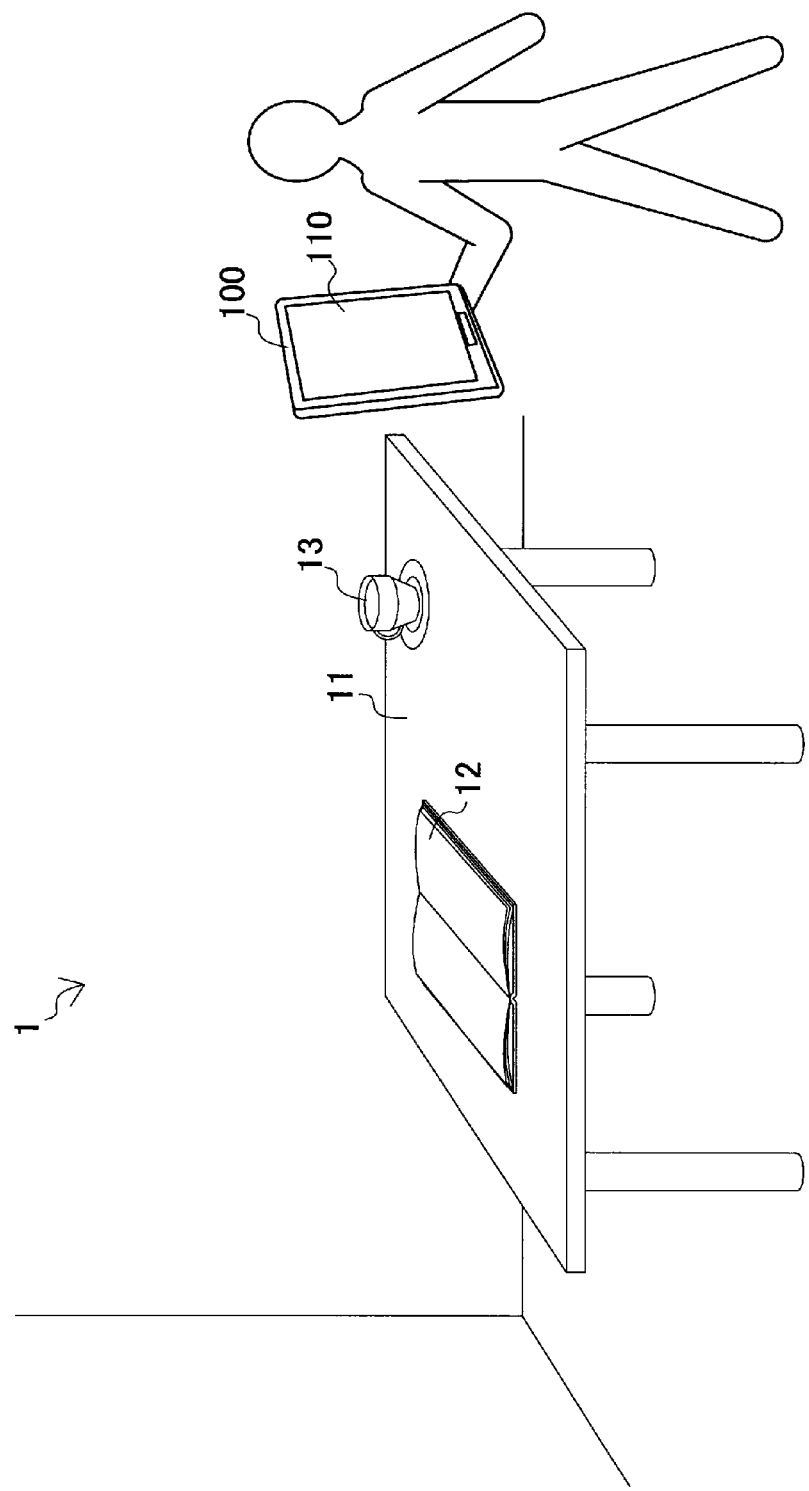
FIG. 1 is an explanatory diagram showing an example of an environment to which the technology according to the present disclosure can be applied.

Hereinafter, embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. Basic Principle
1-1. Overview
1-2. Basic Parameter
1-3. Storage of Parameter
1-4. Display of Virtual Object
2. First Embodiment
2-1. Hardware Configuration
2-2. Functional Configuration
2-3. Operation Scenarios
2-4. Process Flow
2-5. Variation of Display
2-6. Examples of Application
3. Second Embodiment
3-1. System Overview
3-2. Configuration of Server
3-3. Configuration of Terminal
3-4. Process Flow
4. Conclusion

1. BASIC PRINCIPLE

First, the basic principle of the technology according to the present disclosure will be described with reference to FIGS. 1 to 8.

1-1. Overview

FIG. 1 is an explanatory diagram showing an example of an environment to which the technology according to the present disclosure can be applied. Referring to FIG. 1, an environment 1 and an image processing device 100 that captures an image of the environment 1 are shown. In the example in FIG. 1, the environment 1 includes a table 11, a book 12, and a coffee cup 13. The image processing device 100 typically includes an imaging unit (not shown) and a display unit 110. The imaging unit of the image processing device 100 captures a series of images that constitute a video of the environment 1. The image processing device 100 then performs image processing using the captured image as an input image, and arranges a virtual object in the three-dimensional space. The display unit 110 of the image processing device 100 displays an output image with the virtual object overlaid thereon. This virtual object may then be viewed by other processing devices that have a viewing capability (e.g., camera) and interface that receives stored information about the virtual object attached to the reference environment.

The image processing device 100 arranges a virtual object in a given reference environment. That is, the position and the attitude of the virtual object are defined in a coordinate system (hereinafter referred to as a reference coordinate system) associated with the reference environment. In the following description, the environment 1 including the table 11, the book 12, and the coffee cup 13 is the reference environment. In practice, the reference environment may be any indoor or outdoor environment. As another environment, a single real object having a coordinate system specific to the real object may be handled as the reference environment. In such a case, the coordinate system specific to the real object is the reference coordinate system.

FIG. 1 shows a tablet PC as an example of the image processing device 100. However, the image processing device 100 is not limited thereto. The image processing device 100 may be, for example, a notebook PC, a pocket PC, a smartphone, a game terminal, a PND (Portable Navigation Device), a content player, or a digital household electrical appliance.

1-2. Basic Parameter

In the technology according to the present disclosure, the position and the attitude of a virtual object arranged in the reference environment are determined through computation using several parameters. The most basic parameter is an environment recognition matrix.

(1) Environment Recognition Matrix

An environment recognition matrix is a matrix representing the position and the attitude of the reference environment with respect to the position and the attitude of a terminal, which has captured an input image, in the reference environment. The environment recognition matrix may typically be a coordinate transformation matrix representing parallel displacement, rotation, and scaling (enlargement/reduction) in the three-dimensional space (e.g., a 4×4 homogeneous transformation matrix).

Figure 2:
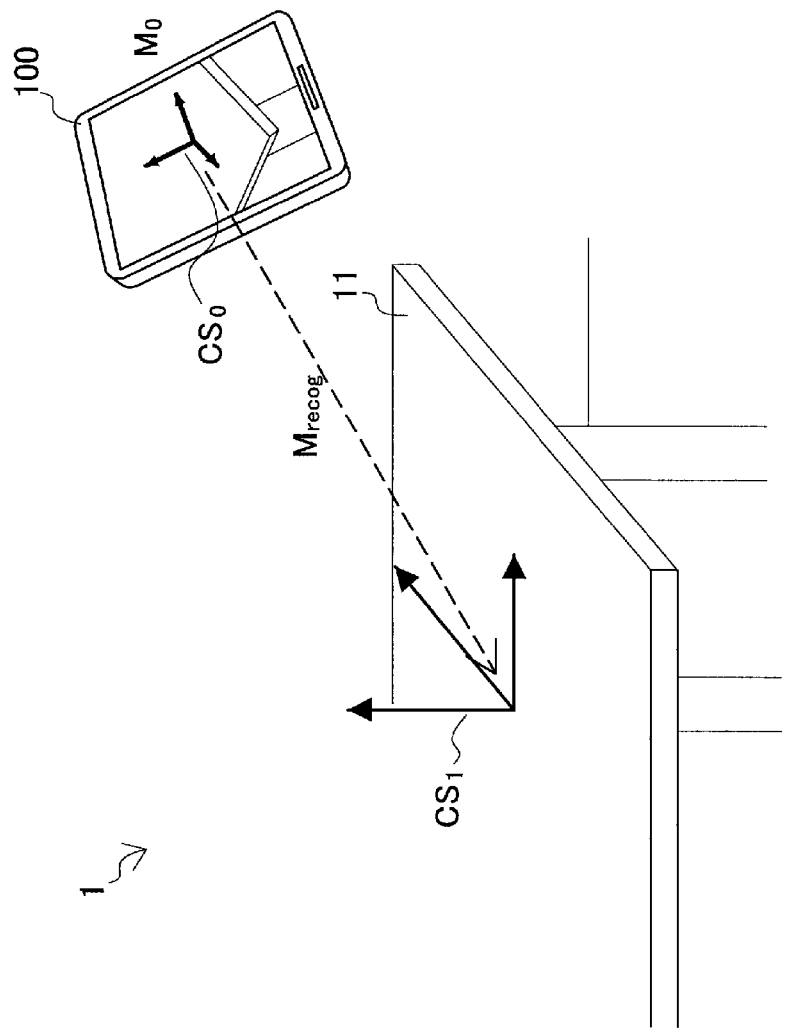
FIG. 2 is a first explanatory diagram illustrating a basic principle of the technology according to the present disclosure.

Referring to FIG. 2, a reference coordinate system $CS_1$ associated with the reference environment 1 and a device-specific coordinate system $CS_0$ of the image processing device 100 are shown. The device-specific coordinate system $CS_0$ can be configured by, for example, a two-dimensional coordinate axis and a depth coordinate axis of a screen of the display unit 110. The relative position and attitude of the reference coordinate system $CS_1$ with respect to the device-specific coordinate system $CS_0$ of the image processing device 100 can be recognized using an input image by utilizing a known image recognition technology. The image recognition technology utilized herein may be, for example, a SfM (Structure from Motion) method, a SLAM (Simultaneous Localization And Mapping) method, or a method described in Patent Literature 1 or 2 above. Alternatively, a simple environment technology that uses an infrared sensor may also be utilized.

Herein, it is assumed that the position and the attitude of the device-specific coordinate system $CS_0$ of the image processing device 100 are represented by a unit matrix $M_0$. Then, it becomes possible to recognize a given position and attitude in the reference environment 1 as coordinate transformation (parallel displacement, rotation, and scaling) from the matrix $M_0$. Thus, a set of a position and an attitude can be represented by a single coordinate transformation matrix. The aforementioned environment recognition matrix is one of such coordinate transformation matrices. An environment recognition matrix $M_{recog}$ represents the position and the attitude of the reference coordinate system $CS_1$ with respect to the position and the attitude of the image processing device 100 (e.g., the unit matrix $M_0$).

(2) Object Arrangement Matrix

Figure 3:
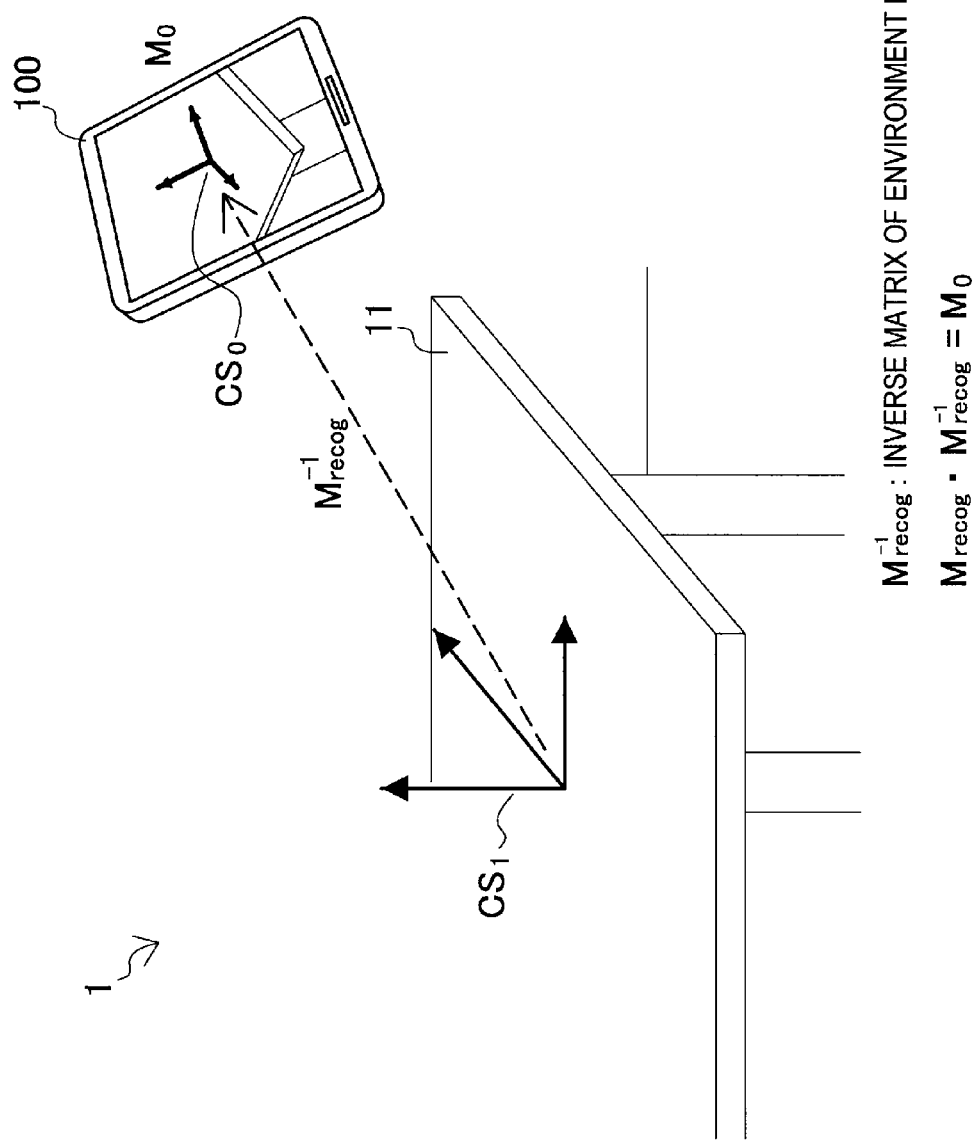
FIG. 3 is a second explanatory diagram illustrating a basic principle of the technology according to the present disclosure.

Under the aforementioned premise, an inverse matrix $M_{recog}^{-1}$ of the environment recognition matrix $M_{recog}$ is a matrix representing the position and the attitude of the image processing device 100 with respect to the position and the attitude of the reference coordinate system $CS_1$. In the technology according to the present disclosure, a virtual object is arranged in the reference environment at a position and an attitude that are based on the inverse matrix $M_{recog}^{-1}$ of the environment recognition matrix. FIG. 3 schematically shows coordinate transformation represented by the inverse matrix $M_{recog}^{-1}$ of the environment recognition matrix.

An object arrangement matrix $M_{arrange}$ is a matrix representing the position and the attitude of an arranged virtual object. The object arrangement matrix $M_{arrange}$ may be equal to the inverse matrix $M_{recog}^{-1}$ of the environment recognition matrix as in the following formula, for example. In this case, a virtual object is arranged at the same position and attitude as the position and the attitude of the image processing device 100 at a point in time when the virtual object is arranged.

[Math.1]

$$M_{arrange} = M_{recog}^{-1} \quad (1)$$

However, when the position and the attitude of the virtual object are not completely matched to the position and the attitude of the image processing device 100, an offset matrix such as the one described next may be used.

(3) Offset Matrix

Figure 4:
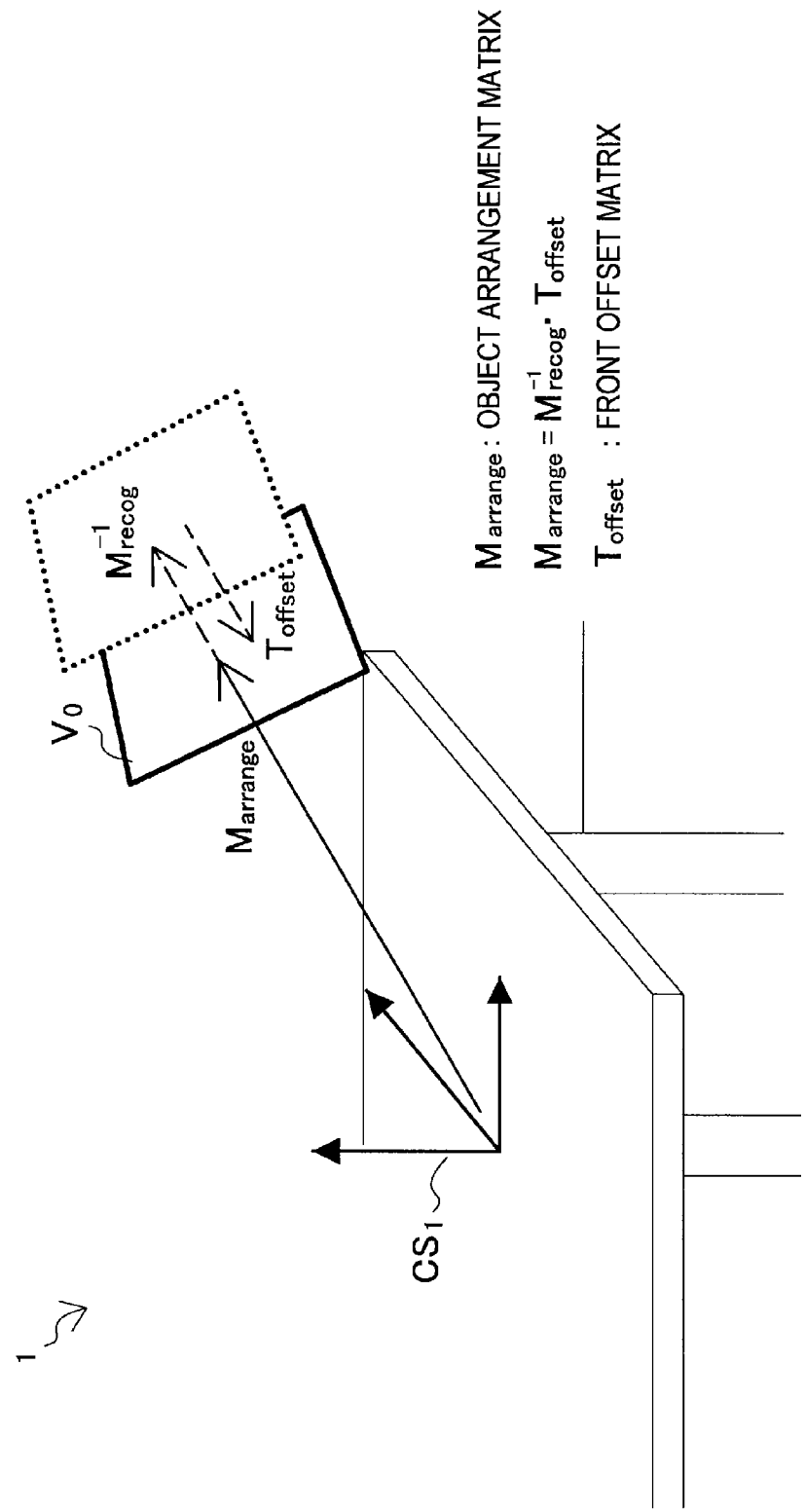
FIG. 4 is a third explanatory diagram illustrating a basic principle of the technology according to the present disclosure.

FIG. 4 schematically shows an object arrangement matrix $M_{arrange}$ that is determined by including a front offset matrix $T_{offset}$ in calculation as an example of an offset matrix. The front offset matrix $T_{offset}$ is a coordinate transformation matrix representing parallel displacement from the position of the image processing device 100 in the imaging direction (depth direction) of the input image by a predetermined distance. When the front offset matrix $T_{offset}$ is included in calculation, the object arrangement matrix $M_{arrange}$ can be calculated as the following formula.

[Math.2]

$$M_{arrange} = M_{recog}^{-1} \cdot T_{offset} \quad (2)$$

When a virtual object is arranged in front of the image processing device 100 by including the front offset matrix $T_{offset}$ in calculation, it becomes possible for a user to quickly view the arranged virtual object on the screen without moving the image processing device 100.

Figure 5:
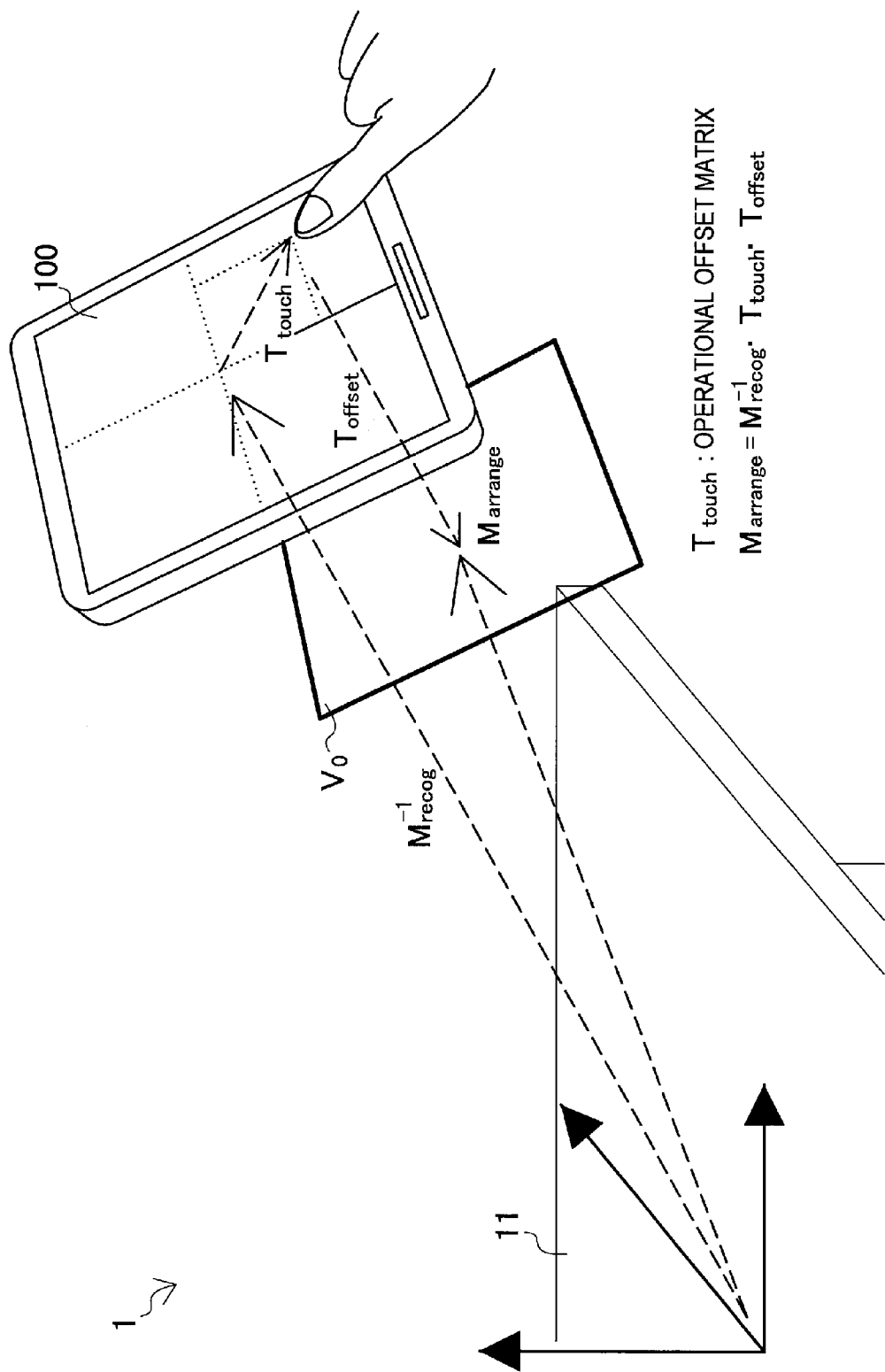
FIG. 5 is a fourth explanatory diagram illustrating a basic principle of the technology according to the present disclosure.

FIG. 5 schematically shows an object arrangement matrix $M_{arrange}$ that is determined by including an operational offset matrix $T_{touch}$ in calculation as an example of an offset matrix. The operational offset matrix $T_{touch}$ is determined according to a user input position on the screen of the image processing device 100. When the operational offset matrix $T_{touch}$ is included in calculation, the object arrangement matrix $M_{arrange}$ can be calculated as the following formula.

[Math.3]

$$M_{arrange} = M_{recog}^{-1} \cdot T_{touch} \cdot T_{offset} \quad (3)$$

When the operational offset matrix $T_{touch}$ is included in calculation as described above, it becomes possible for a user to finely adjust the arrangement of a virtual object by performing an operation (e.g., touch or click) at a desired position on the screen instead of moving the image processing device 100.

1-3. Storage of Parameter

When the arrangement of a virtual object is determined according to the aforementioned principle, the object arrangement matrix $M_{arrange}$ is stored in association with the reference environment.

Figure 6A:
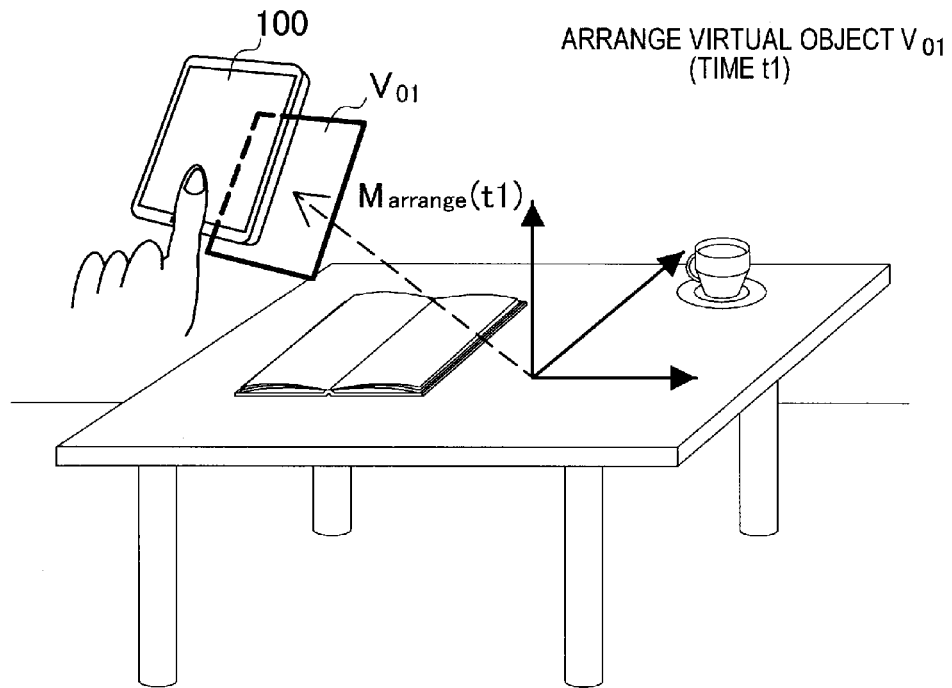
FIG. 6A is a first explanatory diagram showing a view in which a virtual object is arranged according to an exemplary scenario.
Figure 6B:
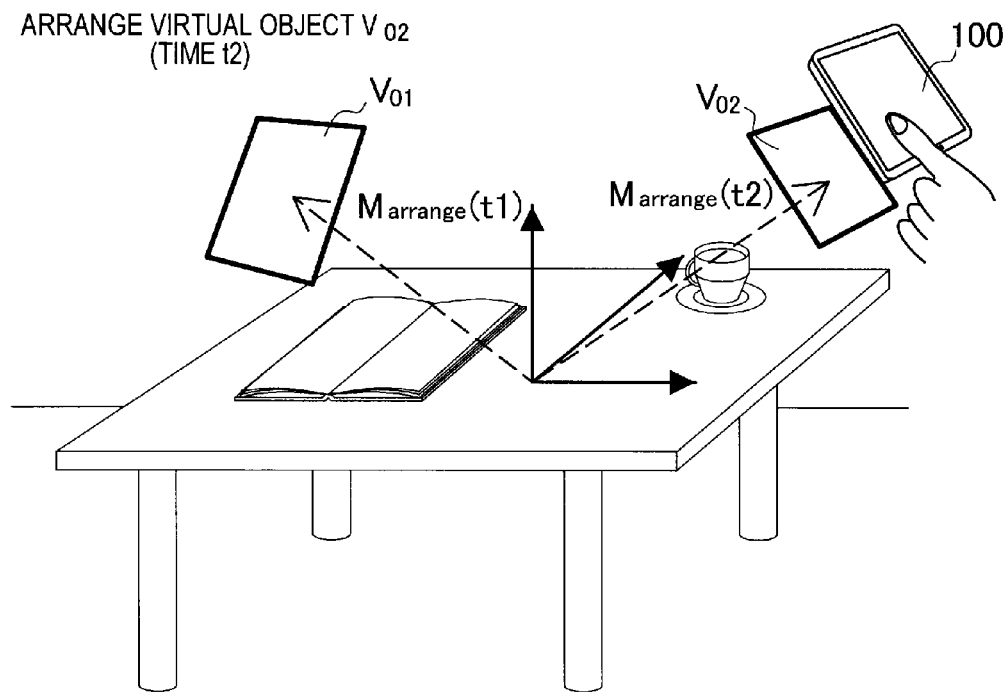
FIG. 6B is a second explanatory diagram showing a view in which a virtual object is arranged according to an exemplary scenario.

For example, referring to the scenarios in FIGS. 6A to 6B, first, a virtual object $V_{01}$ is arranged in the reference environment 1 at time t1. The position and the attitude of the virtual object $V_{01}$ are represented by an object arrangement matrix $M_{arrange}(t1)$ (se FIG. 6A). Next, a virtual object $V_{02}$ is arranged in the reference environment 1 at time t2. The position and the attitude of the virtual object $V_{02}$ are represented by an object arrangement matrix $M_{arrange}(t2)$ (see FIG. 6B).

Consequently, for example, object arrangement data such as the one exemplarily shown in FIG. 7 can be formed. In the example in FIG. 7, the object arrangement data includes four data items of "reference environment," "object ID," "arrangement," and "time." The "reference environment" is an identifier that identifies an environment in which each virtual object is arranged. The "object ID" is an identifier for uniquely identifying each virtual object. The "arrangement" is a data item that stores an object arrangement matrix of each virtual object. The "time" indicates the time when each virtual object is arranged. Each virtual object can be displayed using such object arrangement data.

1-4. Display of Virtual Object

Suppose a circumstance in which the positional relationship between the terminal and the reference environment changes after a virtual object is arranged. This circumstance can be presumed when the terminal moves or the reference environment moves, or in both cases. In this specification, unless the term "parallel displacement" is expressly stated, the term "movement" can include both parallel displacement and rotation. In the aforementioned circumstance, a virtual object is displayed on the screen of the image processing device 100 at a position and an attitude represented by the stored object arrangement matrix $M_{arrange}$ and the environment recognition matrix $M_{recog}$ that is recognized at the latest point in time. For example, the way in which the virtual object $V_{01}$ looks from the image processing device 100 at time t2 shown in FIG. 6B can be represented as the following coordinate transformation that corresponds to the product of the object arrangement matrix $M_{arrange}(t1)$ and the environment recognition matrix $M_{recog}(t2)$ at time t2.

[Math.4]

$$M_{recog}(t2) \cdot M_{arrange}(t1) \quad (4)$$

Figure 8:
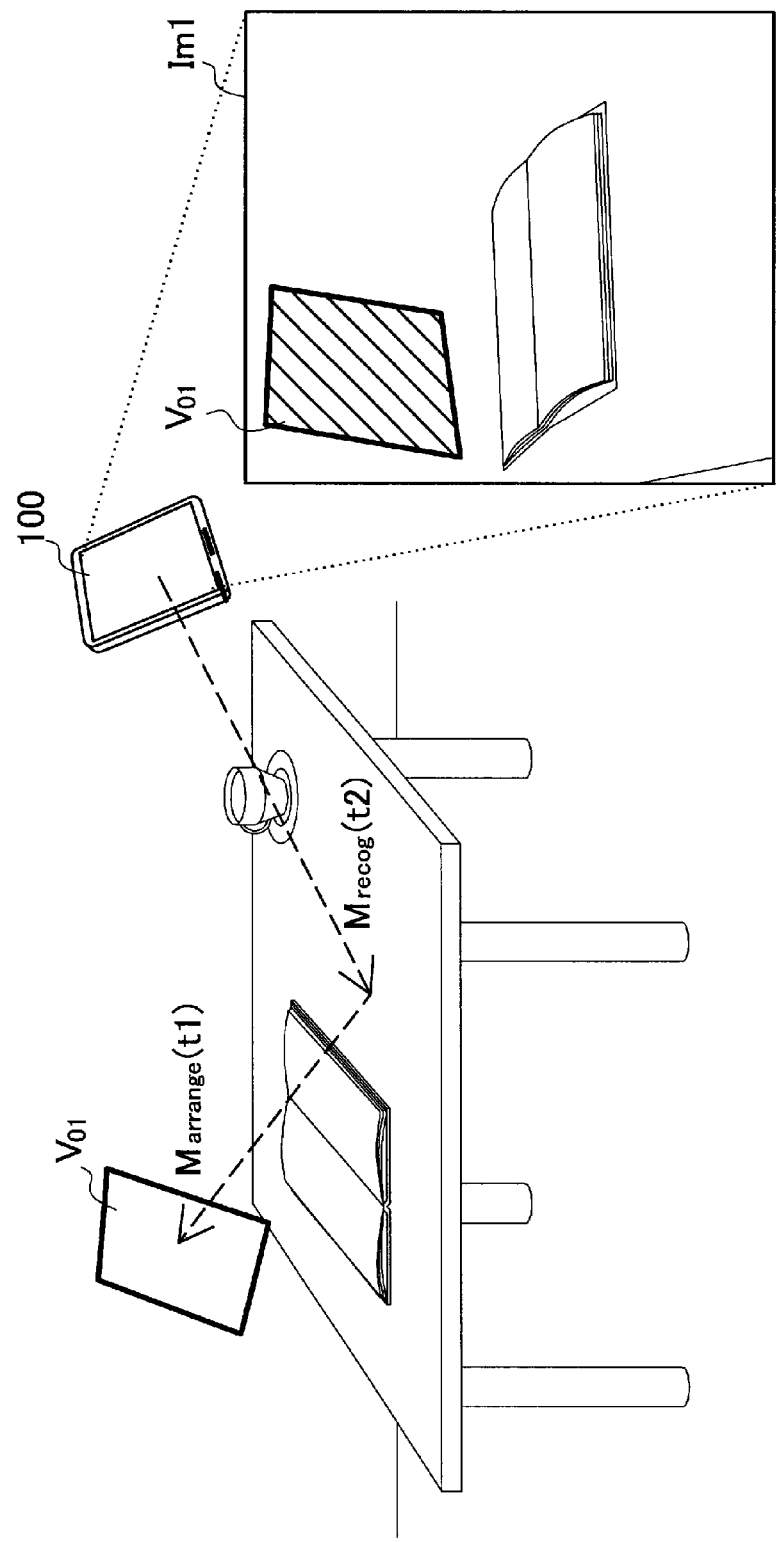
FIG. 8 is a fifth explanatory diagram illustrating a basic principle of the technology according to the present disclosure.

FIG. 8 schematically shows coordinate transformation represented by Formula (4). In an output image Im1 in FIG. 8, a virtual object $V_{01}$ is displayed at a position and an attitude represented by the object arrangement matrix $M_{arrange}(t1)$ and the environment recognition matrix $M_{recog}(t2)$.

By moving and operating a terminal such as the image processing device 100 according to the principle described in this section, the user is able to arrange a virtual object at a desired position and attitude in the reference environment. In addition, as the object arrangement matrix is stored in association with the reference coordinate system, even when the positional relationship between the terminal and the reference environment changes, the virtual object can be displayed so that the relative position and attitude of the virtual object with respect to the reference environment are maintained. According to such principle, an intuitive user interface is provided that has an objective of arranging a virtual object and arranges the virtual object as if it attaches a sticky to the reference environment.

Hereinafter, two exemplary embodiments of the technology according to the present disclosure will be specifically described on the basis of the aforementioned principle.

2. FIRST ENVIRONMENT

In the first embodiment, a virtual object is arranged by the image processing device 100 exemplarily shown in FIG. 1. The arranged virtual object is displayed on the screen of the image processing device 100.

2-1. Hardware Configuration

Figure 9:
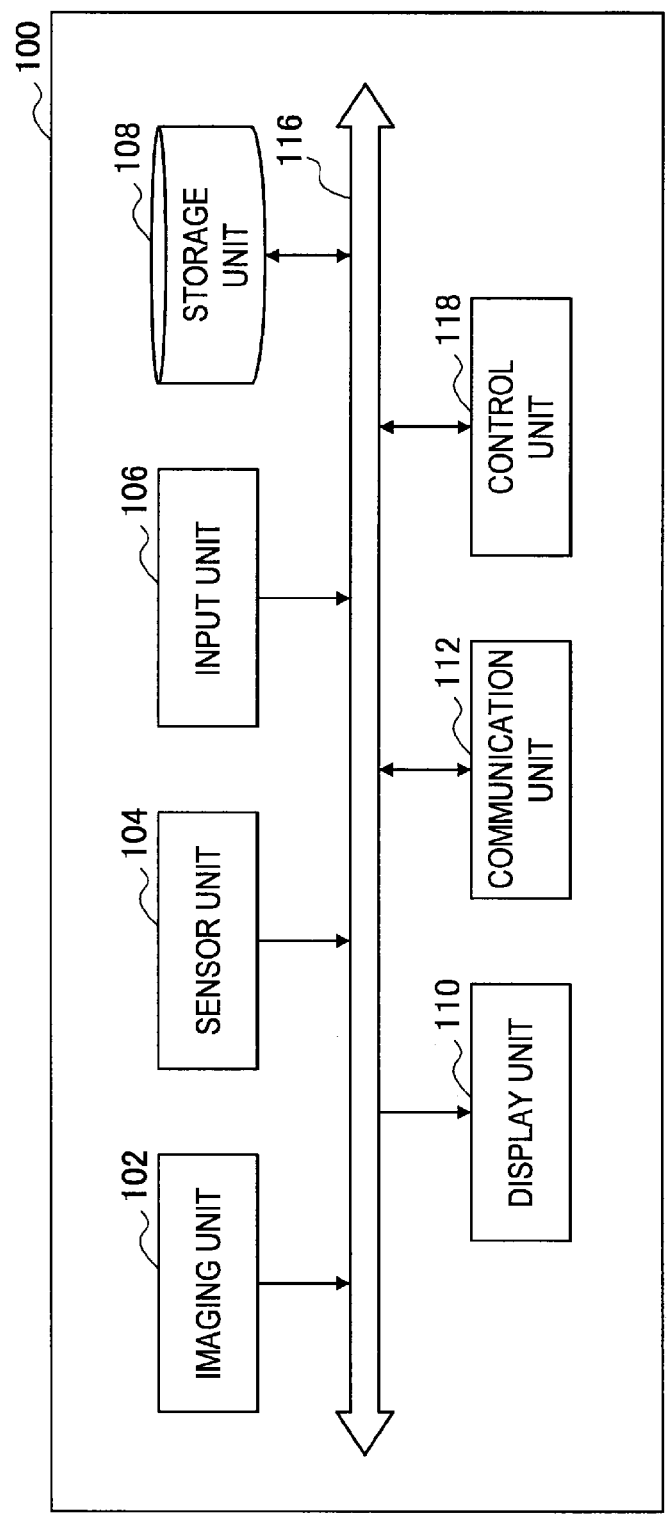
FIG. 9 is a block diagram showing an exemplary hardware configuration of an image processing device according to the first embodiment.

FIG. 9 is a block diagram illustrating an exemplary hardware configuration of the image processing device 100 according to the first embodiment. Referring to FIG. 9, the image processing device 100 includes an imaging unit 102, a sensor unit 104, an input unit 106, a storage unit 108, a display unit 110, a communication unit 112, a bus 116, and a control unit 118.

(1) Imaging Unit

The imaging unit 102 is a camera module that captures an image. The imaging unit 102 captures an image of a real space using an image sensor such as a CCD (Charge Coupled Device) or a CMOS (Complementary Metal Oxide Semiconductor) to generate a captured image. A series of captured images generated by the imaging unit 102 constitutes a video. Note that the imaging unit 102 need not be a part of the image processing device 100. For example, an imaging device connected to the image processing device 100 by wire or wirelessly may be handled as the imaging unit 102. In addition, the imaging unit 102 may include a depth sensor that measures the distance between the imaging unit 102 and a photographic subject for each pixel. The depth data output from the depth sensor can be used to recognize the environment.

(2) Sensor Unit

The sensor unit 104 can include various sensors such as a positioning sensor, an acceleration sensor, and a gyro sensor. The measurement result obtained by the sensor unit 104 may be used for various applications such as for assisting in the recognition of an environment, acquiring data on a geographical location, or detecting a user input. Note that the sensor unit 104 may be omitted from the configuration of the image processing device 100.

(3) Input Unit

The input unit 106 is an input device used for a user to operate the image processing device 100 or input information to the image processing device 100. The input unit 106 may include, for example, a touch sensor that detects a touch of a user on the screen of the display unit 110. Alternatively (or additionally), the input unit 106 may include a pointing device such as a mouse or a touch pad. Further, the input unit 106 may include other types of input device such as a keyboard, a keypad, a button, or a switch.

(4) Storage Unit

The storage unit 108 includes a storage medium such as semiconductor memory or a hard disk, and stores programs and data for processes to be performed by the image processing device 100. Data stored in the storage unit 108 can include, for example, data on the captured image, sensor data, and data in a database (DB) described below. Note that a part of a program and data described in this specification may also be acquired from an external data source (e.g., a data server, a network storage, or external memory) without being stored in the storage unit 108.

(5) Display Unit

The display unit 110 is a display module including a display such as a LCD (Liquid Crystal Display), an OLED (Organic Light-Emitting Diode), or a CRT (Cathode Ray Tube). The display unit 110 is used to display an output image generated by the image processing device 100. Note that the display unit 110 need not be a part of the image processing device 100, either. For example, a display device connected to the image processing device 100 by wire or wirelessly may be handled as the display unit 110.

(6) Communication Unit

The communication unit 112 is a communication interface that intermediates the communication between the image processing device 100 and another device. The communication unit 112 supports a given wireless communication protocol or a wire communication protocol, and establishes communication connection with another device.

(7) Bus

The bus 116 mutually connects the imaging unit 102, the sensor unit 104, the input unit 106, the storage unit 108, the display unit 110, the communication unit 112, and the control unit 118.

(8) Control Unit

The control unit 118 corresponds to a processor such as a CPU (Central Processing Unit) or a DSP (Digital Signal Processor). The control unit 118 causes various functions of the image processing device 100 described below to operate by executing programs stored in the storage unit 108 or another storage medium.

2-2. Functional Configuration

Figure 10:
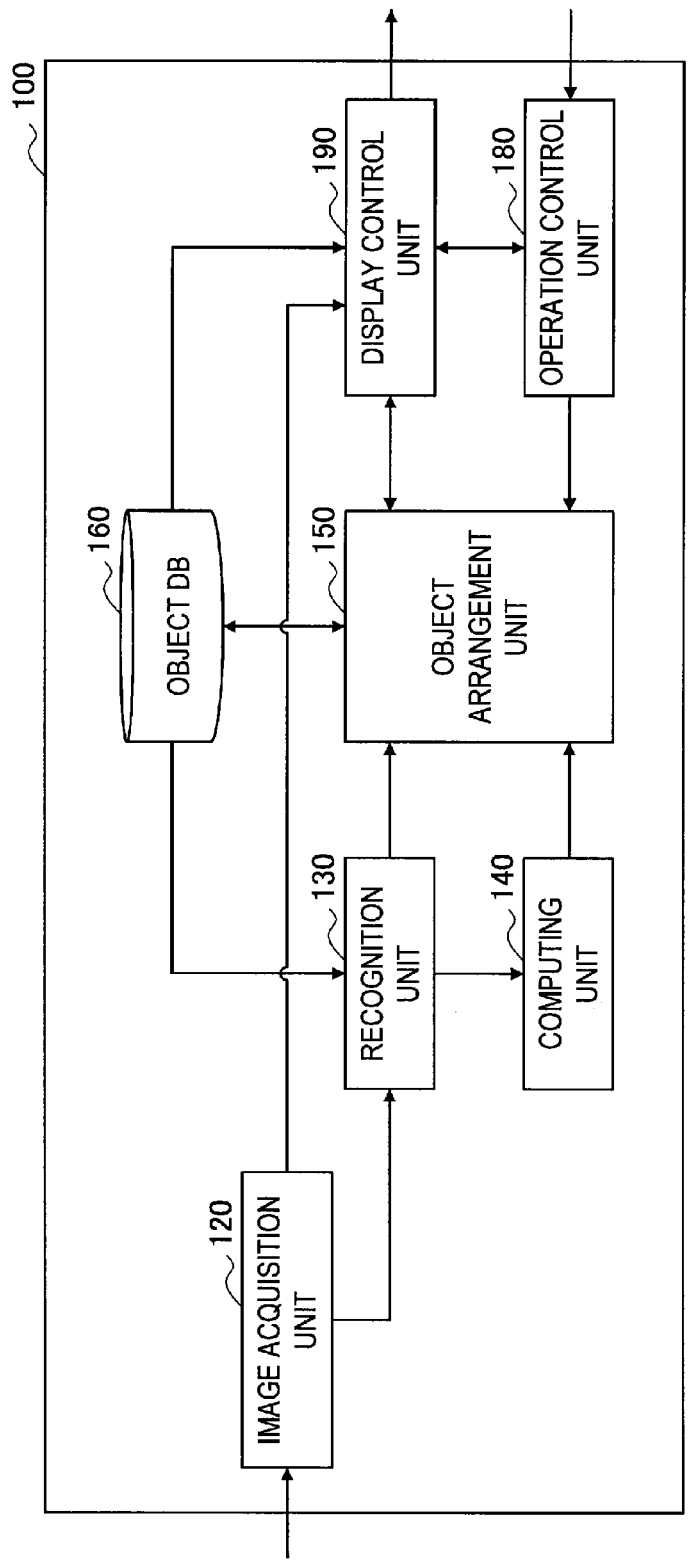
FIG. 10 is a block diagram showing an exemplary configuration of an image processing device according to the first embodiment.

FIG. 10 is a block diagram showing an exemplary configuration of the logical function implemented by the storage unit 108 and the control unit 118 of the image processing device 100 shown in FIG. 9. Referring to FIG. 10, the image processing device 100 includes an image acquisition unit 120, a recognition unit 130, a computing unit 140, an object arrangement unit 150, an object DB 160, an operation control unit 180, and a display control unit 190.

(1) Image Acquisition Unit

The image acquisition unit 120 acquires a captured image generated by the imaging unit 102 as an input image. The input image acquired by the image acquisition unit 120 may be an individual frame that partially constitutes a video of the real space. The image acquisition unit 120 outputs the acquired input image to the recognition unit 130 and the display control unit 190.

(2) Recognition Unit

The recognition unit 130 recognizes the aforementioned environment recognition matrix representing the position and the attitude of the reference environment using the input image acquired from the image acquisition unit 120. The recognition unit 130 can utilize a known image recognition technology such as a SfM method or a SLAM method to recognize the environment recognition matrix. Alternatively or additionally, the recognition unit 130 may recognize the environment recognition matrix on the basis of depth data from the depth sensor provided in the imaging unit 102. As a further alternative, the recognition unit 130 may recognize the environment recognition matrix on the basis of output data from an environment recognition system such as an infrared distance measuring system or a motion capturing system.

For example, when a SLAM method is utilized, the recognition unit 130 updates the position, attitude, speed, and angular velocity of the terminal, and a state variable including the position of one or more feature points in the input image for each frame on the basis of the principle of an extended Kalman filter. Accordingly, the position and the attitude of the reference environment with respect to the position and the attitude of the terminal can be recognized using an input image from a monocular camera. The recognition unit 130 represents the recognized position and attitude of the reference environment using an environment recognition matrix $M_{recog}$ that corresponds to coordinate transformation from the position and the attitude of the terminal. Note that the details of the SLAM method are described in "Real-Time Simultaneous Localization and Mapping with a Single Camera" (Andrew J. Davison, Proceedings of the 9th IEEE International Conference on Computer Vision Volume 2, 2003, pp. 1403-1410).

The recognition unit 130 outputs the thus recognized environment recognition matrix $M_{recog}$ to the computing unit 140 and the object arrangement unit 150.

(3) Computing Unit

The computing unit 140 computes an inverse matrix $M_{recog}^{-1}$ of the environment recognition matrix input from the recognition unit 130. For example, the environment recognition matrix $M_{recog}$ is a 4×4 homogeneous transformation matrix. Thus, the inverse matrix $M_{recog}^{-1}$ of the environment recognition matrix is also a 4×4 homogeneous transformation matrix and satisfies that $M_{recog}$ multiplied by $M_{recog}^{-1}$ equals to $M_0$ (unit matrix). The inverse matrix $M_{recog}^{-1}$ of the environment recognition matrix represents coordinate transformation from the position and the attitude of the reference coordinate system to the position and the attitude of the terminal. The computing unit 140 outputs the computed inverse matrix $M_{recog}^{-1}$ of the environment recognition matrix to the object arrangement unit 150.

(4) Object Arrangement Unit

The object arrangement unit 150 arranges a virtual object having a position and an attitude based on the inverse matrix $M_{recog}^{-1}$ of the environment recognition matrix in the reference environment. The position and the attitude of the arranged virtual object are represented by the aforementioned object arrangement matrix $M_{arrange}$. In the accompanying drawings, a rectangular virtual object is mainly depicted to simply show the position and the attitude of the virtual object. However, a virtual object arranged by the object arrangement unit 150 may have any shape. In addition, the virtual object may be an object presenting any type of information.

The object arrangement unit 150 may, for example, arrange a virtual object so that the virtual object is overlaid on the position and the attitude of the terminal at a position and an attitude represented by the inverse matrix $M_{recog}^{-1}$ of the environment recognition matrix according to Formula (1) above. In addition, the object arrangement unit 150 may arrange a virtual object at a position offset from the position and the attitude of the terminal using one or both of the aforementioned front offset matrix and the operational offset matrix.

When the front offset matrix $T_{offset}$ is used, the object arrangement unit 150 can arrange a virtual object at a position offset from the position represented by the inverse matrix $M_{recog}^{-1}$ of the environment recognition matrix in the imaging direction of the input image according to Formula (2) above. Alternatively, when the operational offset matrix $T_{touch}$ is used, the object arrangement unit 150 can arrange a virtual object at a position offset in the direction along the screen according to a user input position on the screen according to Formula (3) above.

The object arrangement unit 150 outputs the object arrangement matrix $M_{arrange}$ (and another parameter) of the virtual object arranged in the reference environment to the display control unit 190. In addition, the object arrangement unit 150, when a predetermined user input is detected by the operation control unit 180, stores the object arrangement matrix $M_{arrange}$ in the object DB 160 in association with the reference environment. Various examples of a user interface related to the arrangement of a virtual object will be further described below.

(5) Object DB

The object DB 160 is a database having stored therein an object arrangement matrix of a virtual object arranged by the object arrangement unit 150. The object DB 160 can store object arrangement data with a structure such as the one exemplarily shown in FIG. 7. In the object DB 160, an object arrangement matrix is associated with one of the reference environments. Then, the object arrangement data is read from the object DB 160 when a process of displaying a virtual object is executed by the display control unit 190.

(6) Operation Control Unit

The operation control unit 180 provides a user interface for allowing a user to operate an AR application executed in the image processing device 100. For example, the operation control unit 180 displays an indication promoting an operation of an AR application on the screen via the display control unit 190. Then, the operation control unit 180 detects various user inputs via the input unit 106.

A first user input may be a trigger to tentatively arrange and display a virtual object, and a second user input may be a trigger to determine the arrangement of the virtual object and store an object arrangement matrix. The first and second user inputs can be defined so that the first and second user inputs correspond to a start and an end of a series of operations, respectively. A series of operations can correspond to touch or drag, for example. Typically, a start of touch or drag is detected as a press event, and an end of touch or drag is detected as a release event. According to such a user interface, a user is able to freely adjust the arrangement of a virtual object to a desired position and attitude only by performing a simple, intuitive operation of moving a terminal while viewing and touching (or dragging) a screen.

The operation control unit 180, upon detecting the aforementioned user input, outputs input information indicating the type of the detected user input and the input position to the object arrangement unit 150. Note that the type of the user input is not limited to the aforementioned example. For example, pressing of a predetermined key or button, recognition of a touch gesture, recognition of a facial expression, recognition of an audio command, or recognition of a line of sight by a head mounted display may be defined as a user input.

(7) Display Control Unit

The display control unit 190 generates an output image by overlaying a virtual object on an input image according to the arrangement by the object arrangement unit 150. Then, the display control unit 190 displays the generated output image on the screen of the display unit 110. A virtual object is overlaid on the input image at a position and an attitude represented by an object arrangement matrix of the virtual object and an environment recognition matrix recognized at the time of display as described with reference to FIG. 8. For example, a trigger to display a virtual object by the display control unit 190 may be detection of the aforementioned fist user input. Alternatively, a trigger to display a virtual object by the display control unit 190 may be reception of object arrangement data from another device, recognition of some pattern in the input image, or the like.

2-3. Operation Scenarios

Next, two operation scenarios related to an operation on a virtual object will be described with reference to FIGS. 11 to 13. In a first operation scenario, a new virtual object is arranged in the reference environment. In a second operation scenario, the arranged virtual object is moved through an operation of a user.

(1) Arrangement of New Virtual Object

Figure 11:
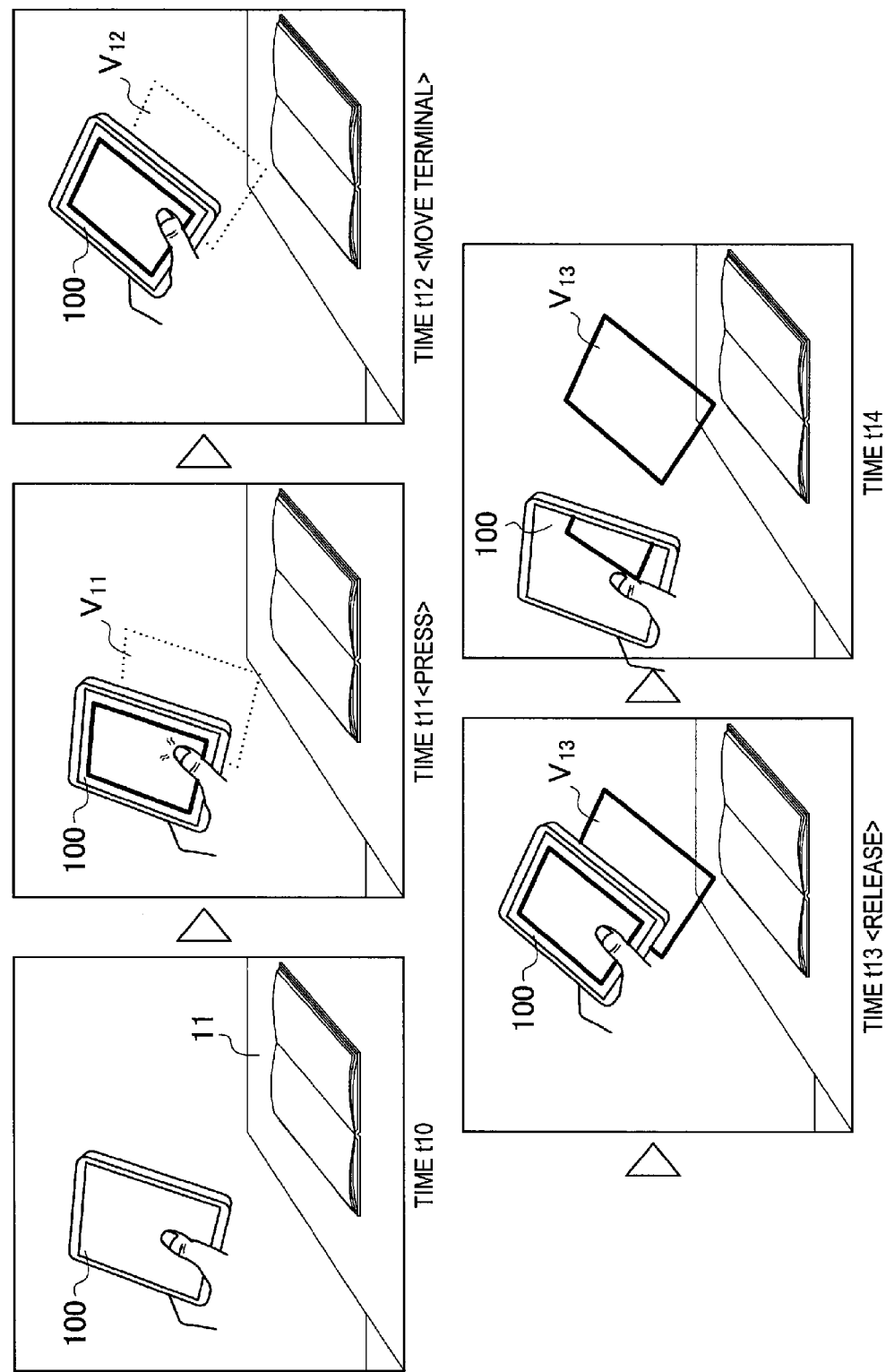
FIG. 11 is an explanatory diagram showing a view in which a new virtual object is arranged in the reference environment according to a first operation scenario.

FIG. 11 shows a view in which a new virtual object is arranged in the reference environment according to the first operation scenario.

First, at time t10, the image processing device 100 is located above the table 11 and is at a slightly tilted attitude. At this point in time, no user input is detected.

Next, at time t11, a press event is detected as a first user input. Then, the object arrangement unit 150 arranges a virtual object $V_{11}$ in front of the image processing device 100. The display control unit 190 displays the arranged virtual object $V_{11}$ on the screen.

At time t12, the user is rotating the image processing device 100 rightward while continuing the press. The object arrangement unit 150 arranges a virtual object $V_{12}$ having an attitude rotated from the attitude of the virtual object $V_{11}$ in front of the image processing device 100. That is, while an operation of the user continues, the arrangement of the virtual object follows the position and the attitude of the terminal.

Next, at time t13, a release event is detected as a second user input. The object arrangement unit 150 arranges a virtual object $V_{13}$ in front of the image processing device 100, and stores an object arrangement matrix of the virtual object $V_{13}$ in the object DB 160. The display control unit 190 displays the virtual object $V_{13}$ with the determined arrangement on the screen. Through a series of operations from time t11 to t13 described above, the user is able to freely arrange a new virtual object in the reference environment.

After that, at time t14, the image processing device 100 is moved leftward as compared to the position at time t13. The recognition unit 130 recognizes a new environment recognition matrix using the input image at time t14. Then, the display control unit 190 displays the virtual object $V_{13}$ on the screen at a position and an attitude represented by the object arrangement matrix of the virtual object $V_{13}$ determined at time $t_{13}$ and the newly recognized environment recognition matrix.

(2) Movement of Virtual Object

As described above, according to the first operation scenario, while a user operation continues, the arrangement of a virtual object follows the position and the attitude of the terminal. Such following operation can be, for the arranged virtual object, realized through a mechanism described below.

Figure 12:
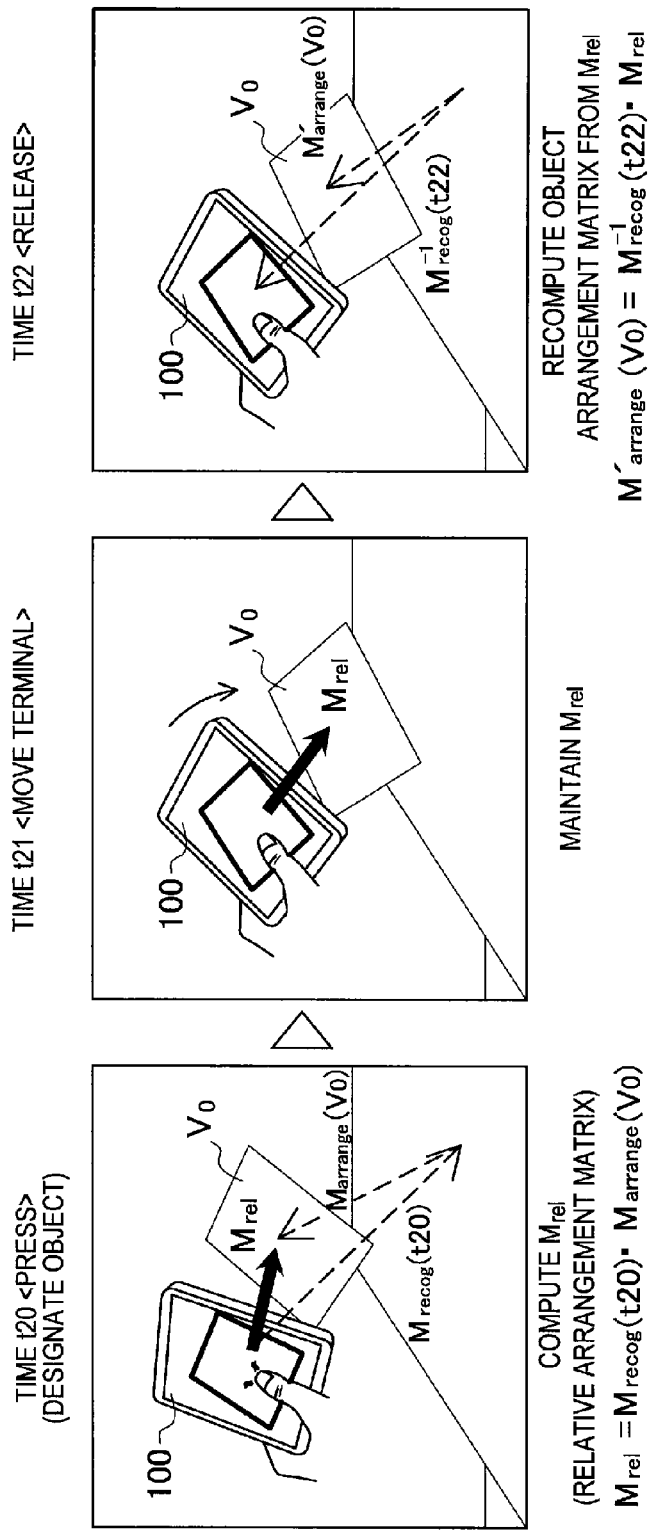
FIG. 12 is an explanatory diagram showing a view in which an arranged virtual object is moved according to a second operation scenario.

FIG. 12 shows a view in which an arranged virtual object moves according to a second operation scenario.

At time t20, a press event is detected. The display control unit 190 identifies a virtual object $V_0$ to be operated according to the press position, for example, and acquires an object arrangement matrix $M_{arrange}(V_0)$ of the virtual object $V_0$. Then, the display control unit 190 computes a relative arrangement matrix $M_{rel}$ that is the product of an environment recognition matrix $M_{recog}(t20)$ at time t20 and the object arrangement matrix $M_{arrange}(V_0)$. The relative arrangement matrix $M_{rel}$ computed herein is maintained until a release event is detected and is used to display the continuously operated virtual object $V_0$.

At time t21, the user is rotating the image processing device 100 rightward while continuing the press. The display control unit 190 displays the virtual object $V_0$ on the screen so that the relative position and attitude of the virtual object $V_0$ with respect to the image processing device 100 are maintained, using the relative arrangement matrix $M_{rel}$ computed at time t20.

After that, a release event is detected at time t22. The recognition unit 130 recognizes a new environment recognition matrix $M_{recog}(t22)$ using the input image at time t22. Then, the object arrangement unit 150 computes a new object arrangement matrix $M'_{arrange}(V_0)$ that is the product of an inverse matrix $M_{recog}^{-1}(t22)$ of the new environment recognition matrix and the relative arrangement matrix $M_{rel}$. Then, the object arrangement unit 150 stores the new object arrangement matrix $M'_{arrange}(V_0)$ in the object DB 160.

Through a series of operations from time t20 to t22 described above, the user is able to freely move the arranged virtual object in a three-dimensional space such that the arranged virtual object is dragged. Note that the number of virtual objects operated by a user interface described herein is not limited to one, and a plurality of virtual objects may be collectively moved through a series of operations.

(3) Switching of Reference Environment

Using the aforementioned relative arrangement matrix $M_{rel}$, it is also possible to switch the reference environment with which a virtual object is associated to a different environment.

Figure 13:
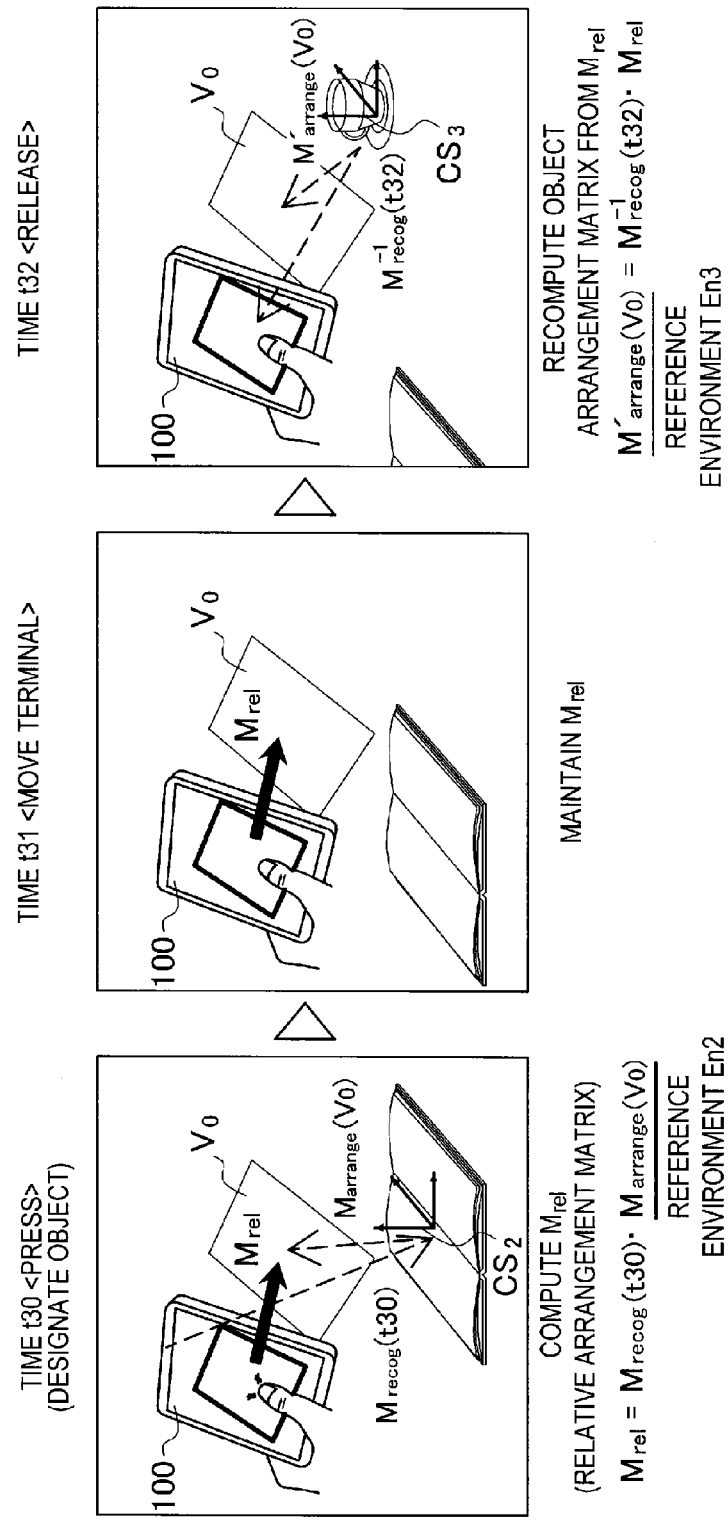
FIG. 13 is an explanatory diagram illustrating switching of the reference environment.

FIG. 13 is an explanatory diagram illustrating switching of the reference environment.

At time t30, a press event is detected. The display control unit 190 identifies a virtual object $V_0$ to be operated according to the press position, for example, and acquires an object arrangement matrix $M_{arrange}(V_0)$ of the virtual object $V_0$. Herein, it is assumed that the object arrangement matrix $M_{arrange}(V_0)$ is associated with a reference environment En2 having a reference coordinate system $CS_2$. Then, the display control unit 190 computes a relative arrangement matrix $M_{rel}$ that is the product of the environment recognition matrix $M_{recog}(t30)$ at time t30 and the object arrangement matrix $M_{arrange}(V_0)$.

At time t31, the user is moving the image processing device 100 while continuing the press. The display control unit 190 displays the virtual object $V_0$ on the screen so that the relative position and attitude of the virtual object $V_0$ with respect to the image processing device 100 is maintained, using the relative arrangement matrix $M_{rel}$ computed at time t30.

After that, at time t32, a release event is detected. The recognition unit 130 recognizes a new environment recognition matrix $M_{recog}(t32)$ representing the position and the attitude of a new environment En3 that appears in the input image at time t32. The environment En3 has a unique coordinate system $CS_3$. Then, the object arrangement unit 150 computes a new object arrangement matrix $M'_{arrange}(V_0)$ that is the product of an inverse matrix $M_{recog}^{-1}(t32)$ of the new environment recognition matrix and the relative arrangement matrix $M_{rel}$. Then, the object arrangement unit 150 stores the new object arrangement matrix $M'_{arrange}(V_0)$ in the object DB 160 in association with the new reference environment En3.

Through the series of operations from time t30 to t32 described above, the user is able to freely move the arranged virtual object as if the arranged virtual object is dragged and dropped from one environment to another or as if a sticky is replaced.

2-4. Process Flow

Figure 14:
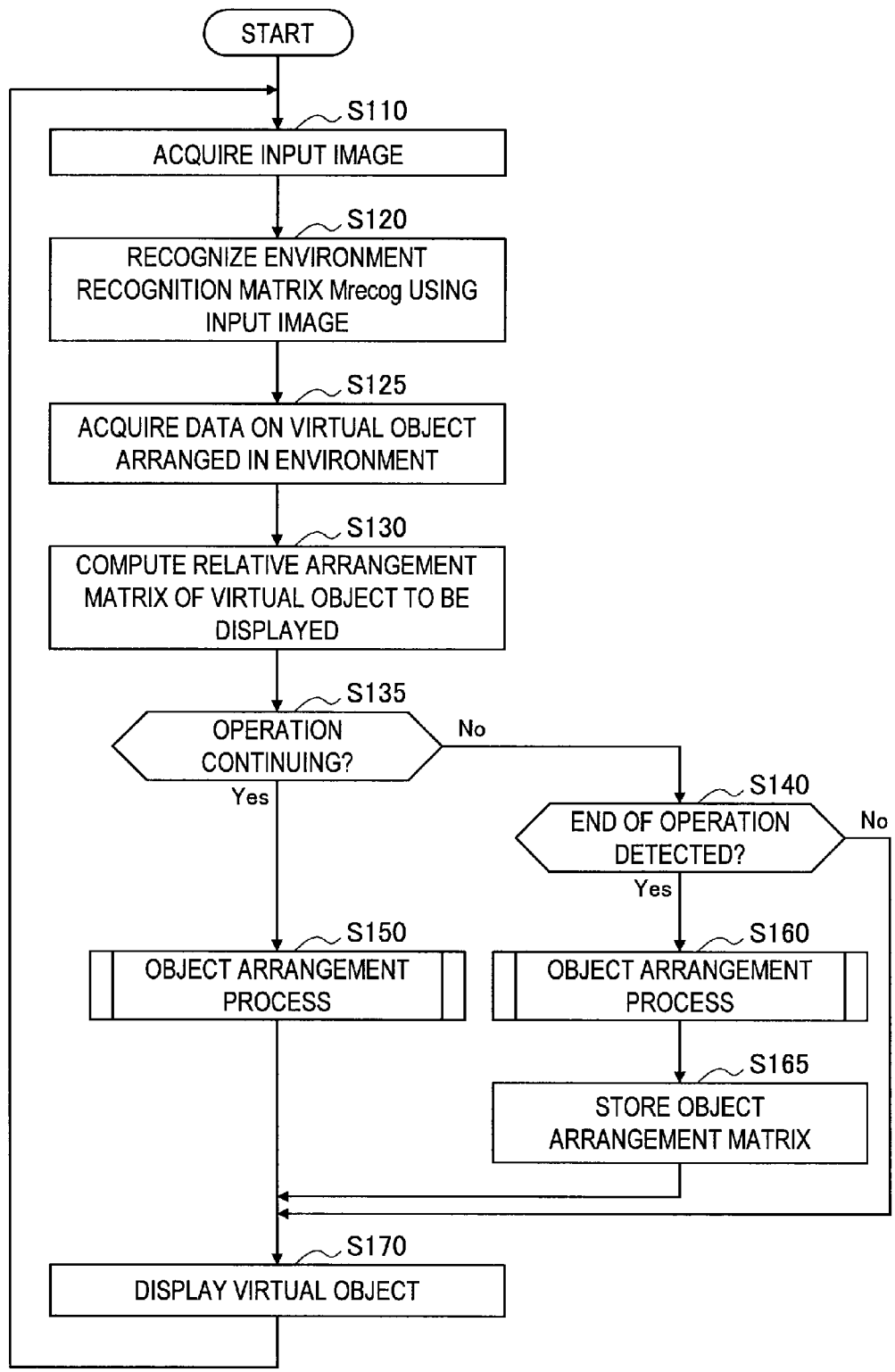
FIG. 14 is a flowchart showing an exemplary flow of image processing according to a first embodiment.

FIG. 14 is a flowchart showing an exemplary flow of image processing performed by the image processing device 100 according to the first embodiment.

Referring to FIG. 14, first, the image acquisition unit 120 acquires a captured image generated by the imaging unit 102 as an input image (step S110). Then, the image acquisition unit 120 outputs the acquired input image to the recognition unit 130 and the display control unit 190.

Next, the recognition unit 130 recognizes an environment recognition matrix $M_{recog}$ representing the position and the attitude of the reference environment using the input image input from the image acquisition unit 120 (step S120). Then, the recognition unit 130 outputs the recognized environment recognition matrix $M_{recog}$ to the computing unit 140, the object arrangement unit 150, and the display control unit 190.

Next, the display control unit 190, if a virtual object that has already been arranged in the reference environment exists, acquires object arrangement data on the arranged virtual object from the object DB 160 (step S125). Then, the display control unit 190 computes, for each virtual object to be displayed, a relative arrangement matrix $M_{rel}$ that is the product of the environment recognition matrix $M_{reocg}$ and the object arrangement matrix $M_{arrange}$ (step S130).

Next, image processing in FIG. 14 branches according to the operation state. First, if a predetermined operation is started by a user or if the predetermined operation is continuing, the process proceeds to step S150 (S135). Alternatively, if an end of an operation that has continued thus far is detected, the process proceeds to step S160 (step S140). Otherwise, the process proceeds to step S170.

Figure 15:
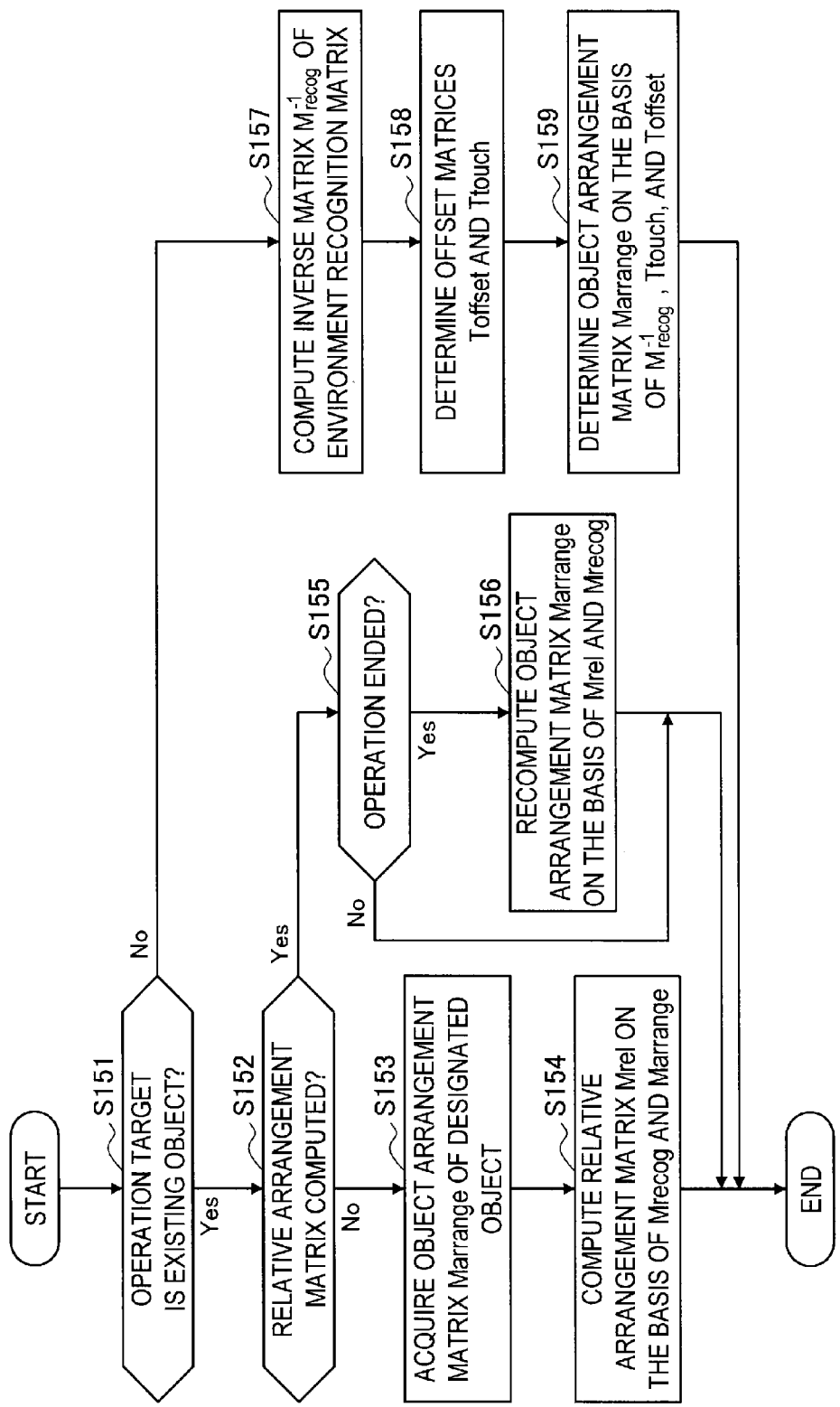
FIG. 15 is a flowchart showing an exemplary detailed flow of an object arrangement process exemplarily shown in FIG. 14.

In step S150, an object arrangement process described in detail with reference to FIG. 15 is executed.

In step S160, an object arrangement process described in detail with reference to FIG. 15 is executed. After that, an object arrangement matrix that is newly determined or updated for a virtual object to be operated is stored in the object DB 160 (step S165).

Then, the display control unit 190 generates an output image having overlaid thereon the virtual object to be operated and (an)other virtual object(s) to be displayed, and displays the generated output image on the screen of the display unit 110 (step S170).

FIG. 15 is a flowchart showing an exemplary detailed flow of the object arrangement process corresponding to steps S150 and S160 in FIG. 14.

The object arrangement process in FIG. 15 branches depending on whether the virtual object to be operated is the existing (arranged) object or not (step S151). If the virtual object to be operated is not the existing object, the process proceeds to step S157. Meanwhile, if the virtual object to be operated is the existing object, the process proceeds to step S152.

In step S152, the object arrangement process further branches depending on whether a relative arrangement matrix $M_{rel}$ has been computed for the virtual object to be operated or not. If the relative arrangement matrix $M_{rel}$ has not been computed, the process proceeds to step S153. Meanwhile, if the relative arrangement matrix $M_{rel}$ has been computed, the process proceeds to step S155.

If the virtual object to be operated is the existing object and the relative arrangement matrix $M_{rel}$ has not been computed, the display control unit 190 first acquires an object arrangement matrix $M_{arrange}$ of the virtual object to be operated (step S153). Then, the display control unit 190 computes the relative arrangement matrix $M_{rel}$ on the basis of the environment recognition matrix $M_{recog}$ at this point in time and the acquired object arrangement matrix $M_{arrange}$ (step S154).

If the virtual object to be operated is the existing object and the relative arrangement matrix $M_{rel}$ has been computed, the display control unit 190 first determines if an end of an operation has been detected (step S155). Then, if an end of an operation is detected, the display control unit 190 recomputes the object arrangement matrix $M_{arrange}$ of the virtual object to be operated on the basis of the relative arrangement matrix $M_{rel}$ and the environment recognition matrix $M_{recog}$ at this point in time (step S156).

If a new virtual object is to be arranged, the computing unit 140 computes an inverse matrix $M_{recog}^{-1}$ of an environment recognition matrix input from the recognition unit 130 (step S157). In addition, the object arrangement unit 150 determines a front offset matrix $T_{offset}$ and an operational offset matrix $T_{touch}$ (step S158). Note that when such offset matrices are not used, the process in step S158 may be omitted. Then, the object arrangement unit 150 determines an object arrangement matrix $M_{arrange}$ of the virtual object to be newly arranged on the basis of the inverse matrix $M_{recog}^{-1}$ of the environment recognition matrix, the front offset matrix $T_{offset}$, and the operational offset matrix $T_{touch}$.

2-5. Variations of Display

In the technology according to the present disclosure, a virtual object can be displayed in various configurations. In this section, various display variations of a virtual object will be described.

(1) Determination of Reference Plane

For example, a virtual object may have a predefined reference plane. When a virtual object has a card-like planar shape, one surface of the virtual object can be defined as a reference plane and the other surface thereof can be defined as a non-reference plane. When a virtual object has a stereoscopic shape, the reference plane of the virtual object can be identified by a normal vector extending outward from the reference plane. As described above, when a virtual object has a reference plane, the display control unit 190 may change the display of the virtual object depending on whether the reference plane of the virtual object appears in the screen of the image processing device 100 or not.

Figure 16:
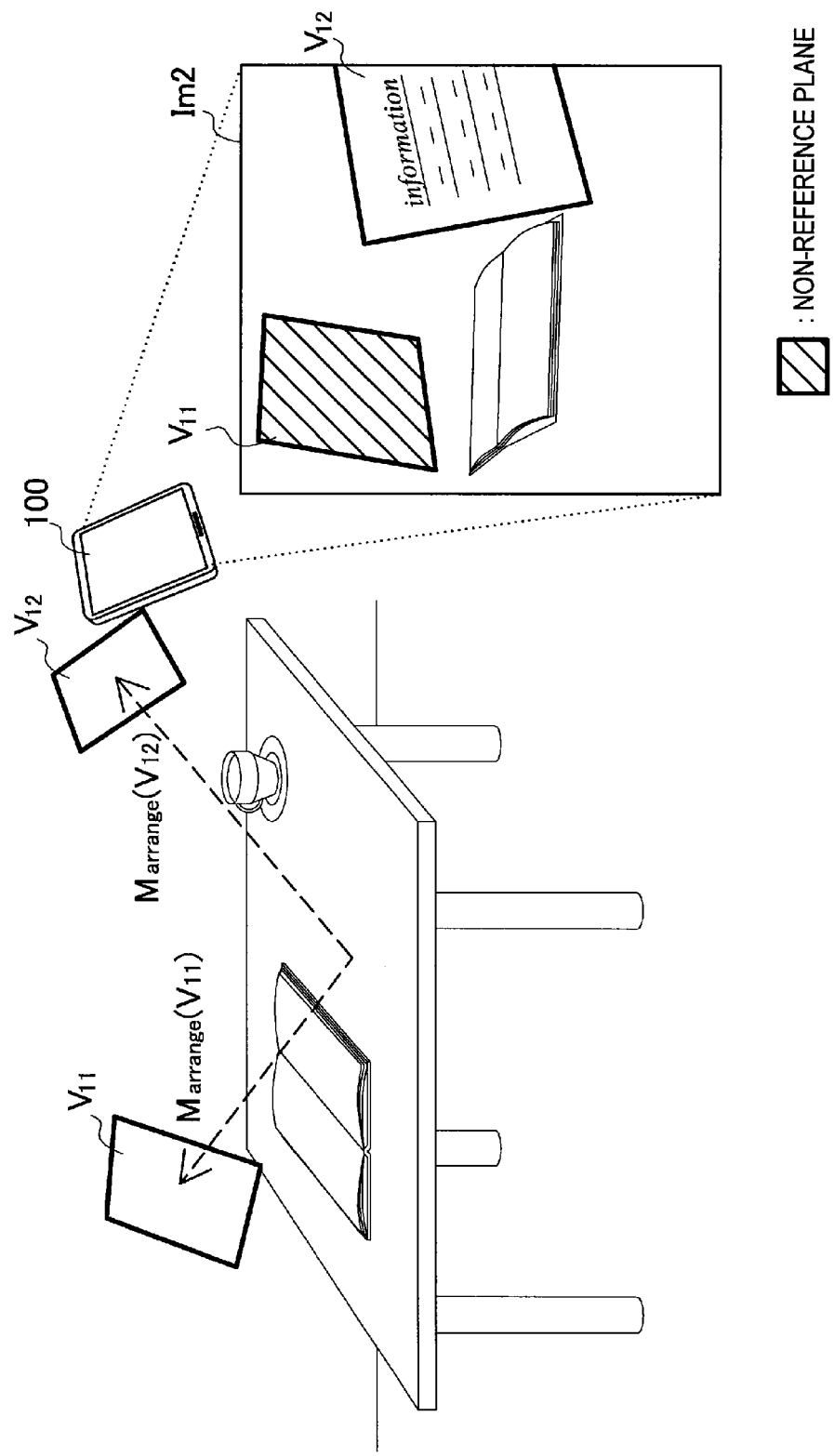
FIG. 16 is an explanatory diagram illustrating determination of a reference plane of a virtual object.

For example, referring to the example in FIG. 16, two virtual objects $V_{11}$ and $V_{12}$ appear in the screen of the image processing device 100. A plane of the virtual object $V_{11}$ that appears in the screen of the image processing device 100 is a non-reference plane. A plane of the virtual object $V_{12}$ that appears in the screen of the image processing device 100 is a reference plane. Thus, the display control unit 190 can set, for example, display attributes such as the shape, scale, transparency, color, resolution, and edge thickness of the virtual object $V_{12}$ to different values from those of the virtual object $V_{11}$. In addition, the display control unit 190 may change the information indicated by each of the virtual objects $V_{11}$ and $V_{12}$ depending on whether a reference plane appears or not.

Through the aforementioned display control, the user is able to easily grasp the orientation of the displayed virtual object.

(2) Display according to Distance

The display control unit 190 may change the display of a virtual object according to the distance between the image processing device 100 and the virtual object.

Figure 17:
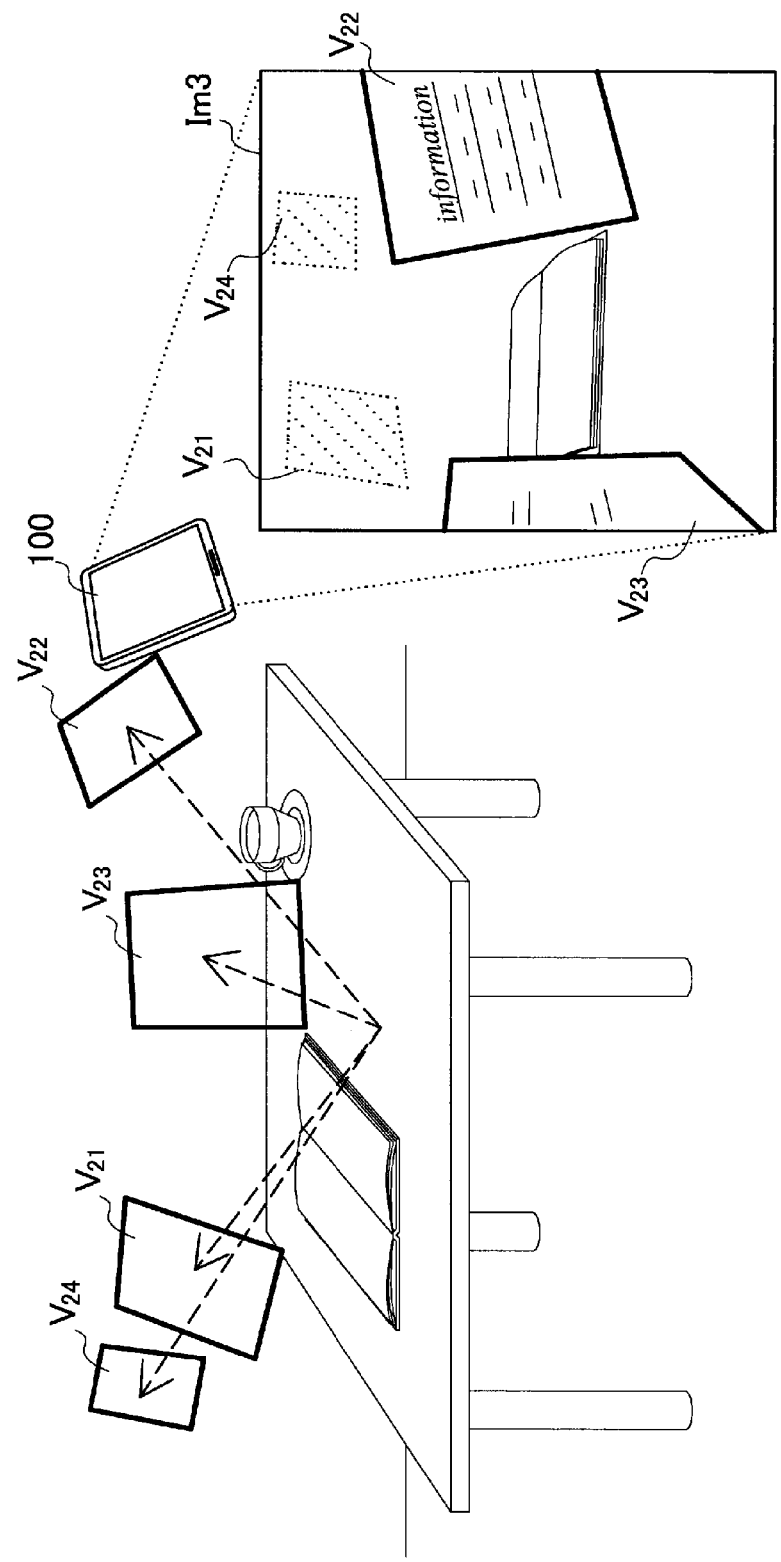
FIG. 17 is an explanatory diagram illustrating display performed according to the distance from a virtual object.

For example, referring to the example in FIG. 17, four virtual objects $V_{21}$, $V_{22}$, $V_{23}$, and $V_{24}$ appear in the screen of the image processing device 100. Among them, the virtual objects $V_{21}$ and $V_{24}$ are located farther from the image processing device 100 than are the virtual objects $V_{22}$ and $V_{23}$. In this case, the display control unit 190 can emphasize any of the display attributes of the virtual objects $V_{22}$ and $V_{23}$ so that the virtual objects $V_{22}$ and $V_{23}$ can be more clearly recognized by the user. In addition, the display control unit 190 may display more detailed information on the virtual objects $V_{22}$ and $V_{23}$.

Through the aforementioned display control, it is possible to increase the visibility of a virtual object (or displayed information thereof) that a user is more interested in (i.e., to which a user is having his/her terminal closer) under the condition that a number of virtual objects are displayed on the screen.

(3) Alignment Display

The display control unit 190 may, when a predetermined condition is satisfied, re-arrange a plurality of virtual objects to be displayed so that the plurality of virtual objects are aligned with a predetermined space therebetween.

Figure 18:
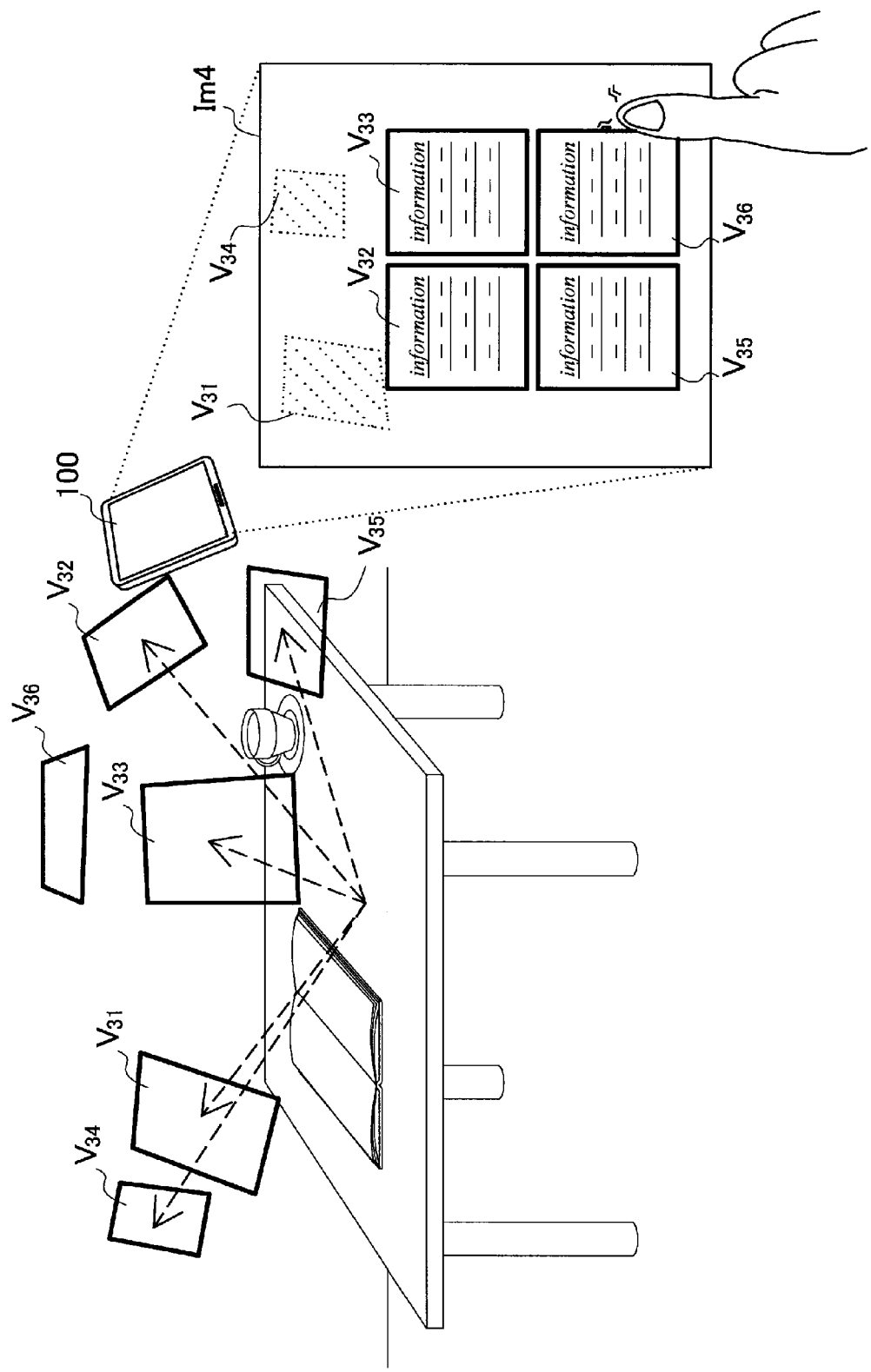
FIG. 18 is an explanatory diagram illustrating alignment display for virtual objects.

For example, referring to the example in FIG. 18, six virtual objects $V_{31}$ to $V_{36}$ appear in the screen of the image processing device 100. However, when such virtual objects are displayed according to their arrangements, the virtual objects would be congested within the screen, and the visibility of the virtual objects would decrease. Thus, for example, the display control unit 190, when a predetermined user input is detected, aligns the virtual objects. In the example in FIG. 18, four virtual objects $V_{32}$, $V_{33}$, $V_{35}$, and $V_{36}$ located closer to the image processing device 100 are re-arranged so that they are aligned with a predetermined space therebetween. The predetermined condition for re-arranging the virtual objects may be that, instead of a user input, the number of virtual objects within the screen should be greater than a predetermined threshold, for example.

Through the aforementioned display control, it is possible to increase the visibility of information indicated by each virtual object under the circumstance in which a number of virtual objects are displayed on the screen.

2-6. Examples of Application

The technology according to the present disclosure can be applied not only to AR applications described heretofore but also to various applications. In this section, two examples of application will be described.

(1) Storage of Track/Animation

For example, the object arrangement unit 150, when a user input indicating a start of storage is detected, sequentially stores object arrangement matrices of a virtual object for a plurality of images in the object DB 160 in association with the reference environment. Accordingly, it becomes possible to easily generate a track of a virtual object or an animation of a moving virtual object that follows along the track of the moving image processing device 100.

For example, the display control unit 190 may, by overlaying a plurality of instances of a virtual object on a single input image according to a plurality of object arrangement matrices that have been sequentially stored, display the track of the virtual object in the environment in the input image. Alternatively, the display control unit 190 may display a moving animation of a virtual object by sequentially overlaying an instance of the virtual object on each of a series of input images according to each of a plurality of object arrangement matrices that have been sequentially stored.

Figure 19:
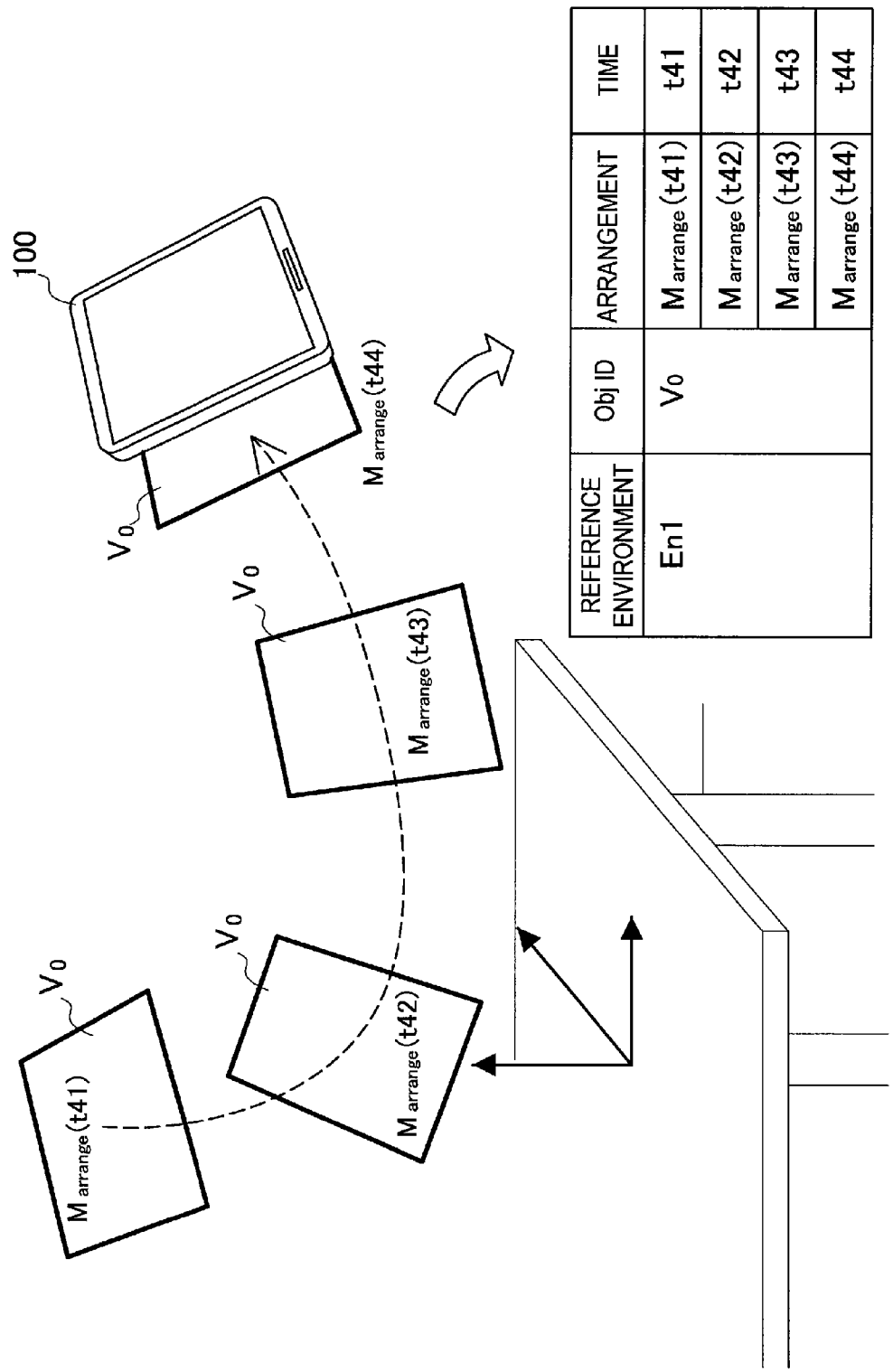
FIG. 19 is an explanatory diagram illustrating sequential storage of object arrangement matrices.

Referring to the example in FIG. 19, object arrangement matrices $M_{arrange}(t41)$ to $M_{arrange}(t44)$ of four instances of a virtual object $V_0$ are stored in association with a reference environment En1 along the movement track of the image processing device 100 from time t41 to time t44. When the four instances of the virtual object $V_0$ are overlaid on a single frame, the track of the virtual object $V_0$ is displayed. Meanwhile, when four instances of the virtual object $V_0$ are overlaid on different frames at respective timings, a moving animation of the virtual object $V_0$ is displayed.

The display control unit 190 may interpolate an additional object arrangement matrix representing the posture and the attitude of a virtual object between different points in time from object arrangement matrices that have been stored at different points in time. Accordingly, a track or an animation with higher temporal resolution can be generated from a small number of pieces of object arrangement data. In addition, if a curve interpolation method that uses a three-dimensional spline curve or a Bezier curve, for example, is adopted as an interpolation method herein, smooth interpolation can be performed.

(2) Storage of Imaging Position and Imaging Attitude

When the technology according to the present disclosure is mounted on an imaging device, the history of imaging can be recorded in association with an environment of a photographic subject. For example, suppose that the image processing device 100 is a digital camera or a terminal having an imaging function. In such a case, an input image is a photograph of a photographic subject. The object arrangement unit 150, in order to record an imaging position and an imaging attitude of when a photographic subject was captured, registers the aforementioned object arrangement matrix in a database. After that, when a virtual object is displayed on a screen of the terminal in the same environment according to the registered object arrangement matrix, a user can know at which imaging position and imaging attitude a photograph was captured. A trigger to register an object arrangement matrix may be, for example, a user input (e.g., pressing of a shutter button) corresponding to an instruction to capture an image. According to such a configuration, an object arrangement matrix is automatically registered in a database when an instruction to capture an image is detected. Thus, it is possible to register the imaging position and the imaging attitude without imposing an additional load on a user who takes a photograph.

3. SECOND EMBODIMENT

In the second embodiment, a plurality of terminal devices 300 each having about the same configuration as the aforementioned image processing device 100 share a virtual object arranged in the AR space.

3-1. System Overview

Figure 20:
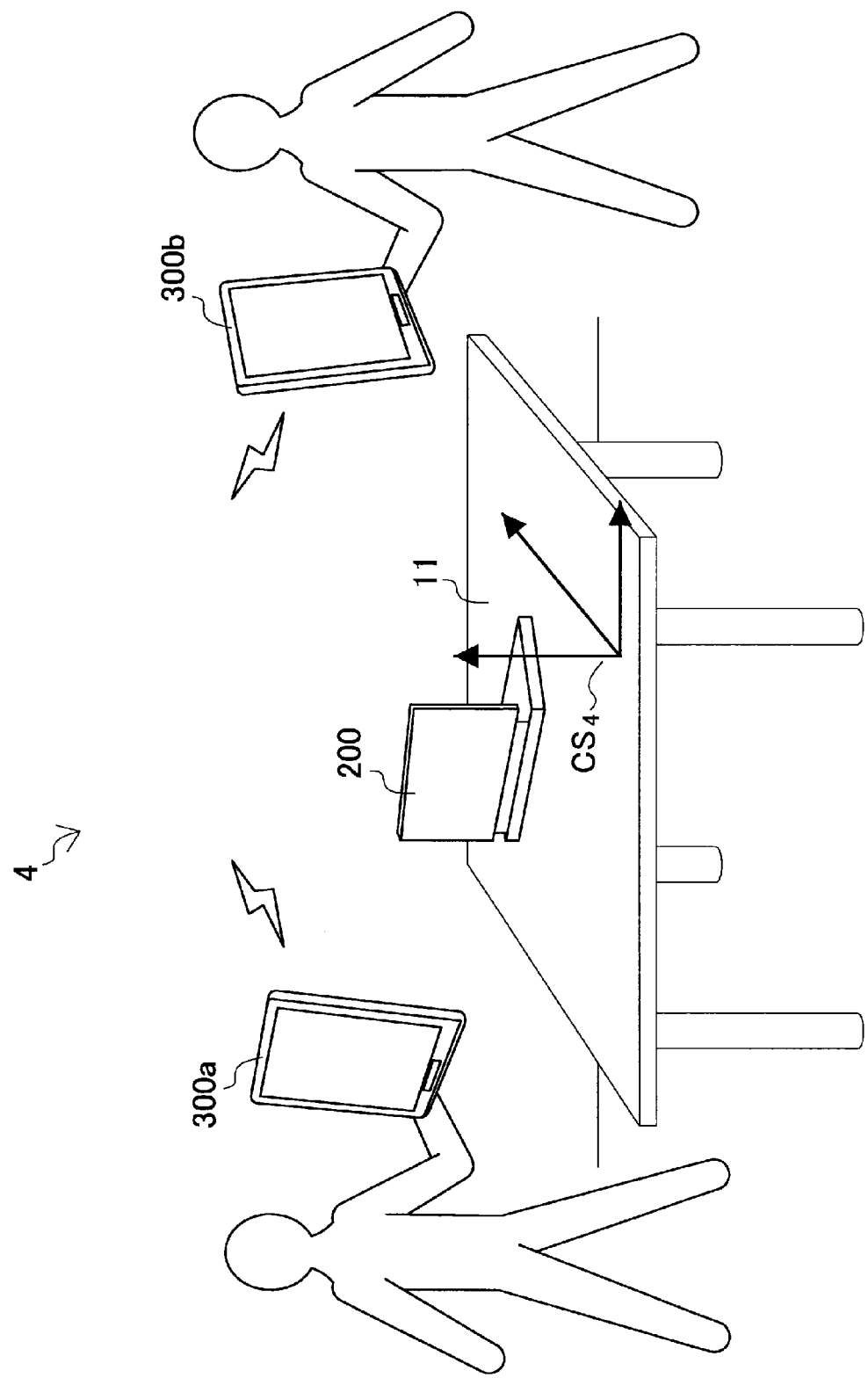
FIG. 20 is a first explanatory diagram illustrating an image processing system according to a second embodiment.

Referring to FIG. 20, a management server 200, a terminal device 300a, and a terminal device 300b that constitute an image processing system according to the second embodiment are shown. Note that in this specification, the terminal device 300a and the terminal device 300b are collectively referred to as terminal devices 300 unless they should be distinguished from each other.

The terminal device 300 arranges a virtual object in a given reference environment. In the example in FIG. 20, an environment 4 corresponding to a single space including a table 11 is shown as a reference environment. However, a reference environment to which the technology according to the present disclosure is applied is not limited thereto. For example, even when a space in which the terminal device 300a exists differs from a space in which the terminal device 300b exists, if a feature point group or an object that is common to the two spaces exists, or if calibrated coordinate systems that can be viewed as the same exist, it is possible to handle a plurality of environments corresponding to the spaces as a single common reference environment. Alternatively, environments that are recognized at different times in a single space may be handled as a single common reference environment.

Figure 21A:
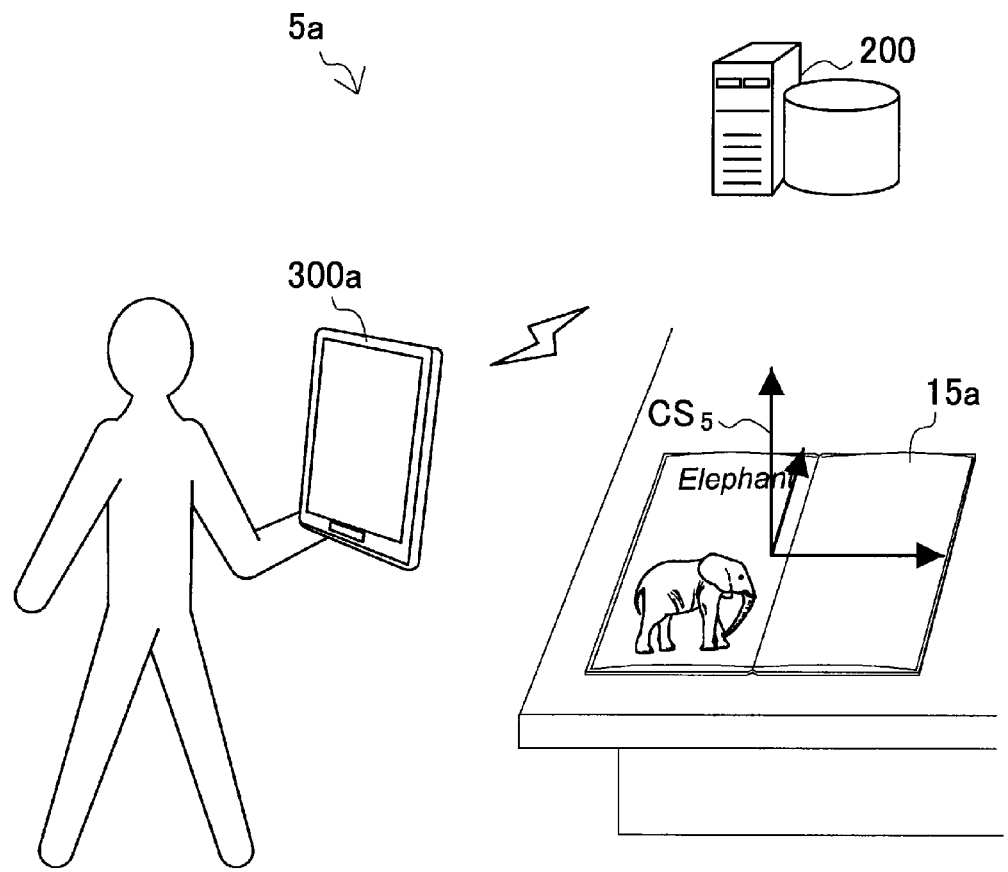
FIG. 21A is a second explanatory diagram illustrating an image processing system according to the second embodiment.
Figure 21B:
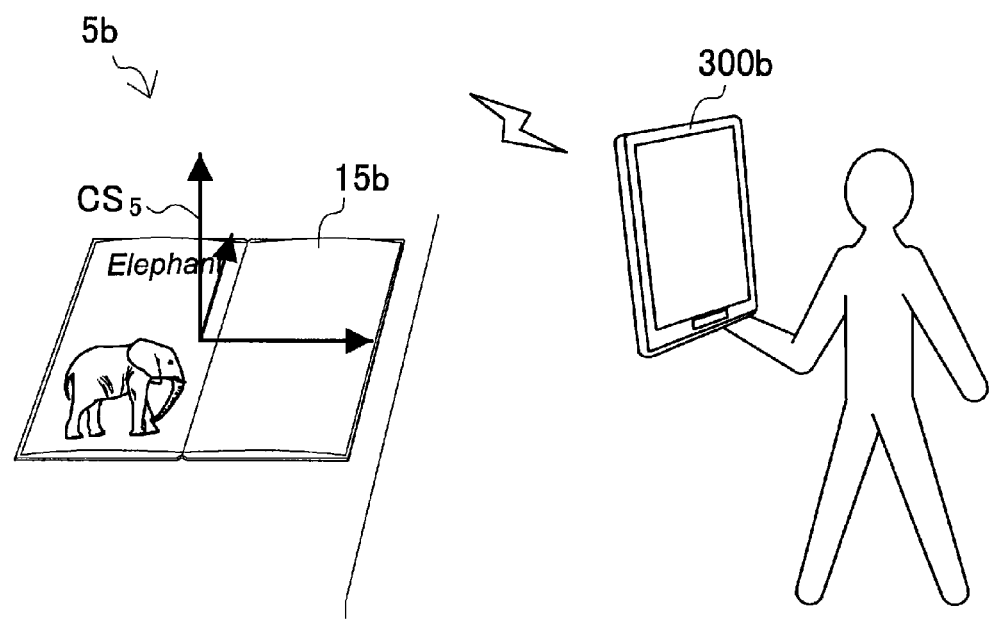
FIG. 21B is a third explanatory diagram illustrating an image processing system according to the second embodiment.

For example, referring to FIG. 21A, a terminal device 300a and a book 15a exist in an environment 5a. Referring to FIG. 21B, 1a terminal device 300b and a book 15b exist in an environment 5b. The book 15a and the book 15b have a common feature point group. Thus, the terminal devices 300a and 300b can recognize a single common reference coordinate system $CS_5$ using such a feature point group and thus share a virtual object associated with the reference coordinate system $CS_5$.

The management server 200 is an information processing device that manages data on a shared virtual object. The management server 200 may be a device provided separately from the terminal device 300 or a part of the terminal device 300.

3-2. Configuration of Server

Figure 22:
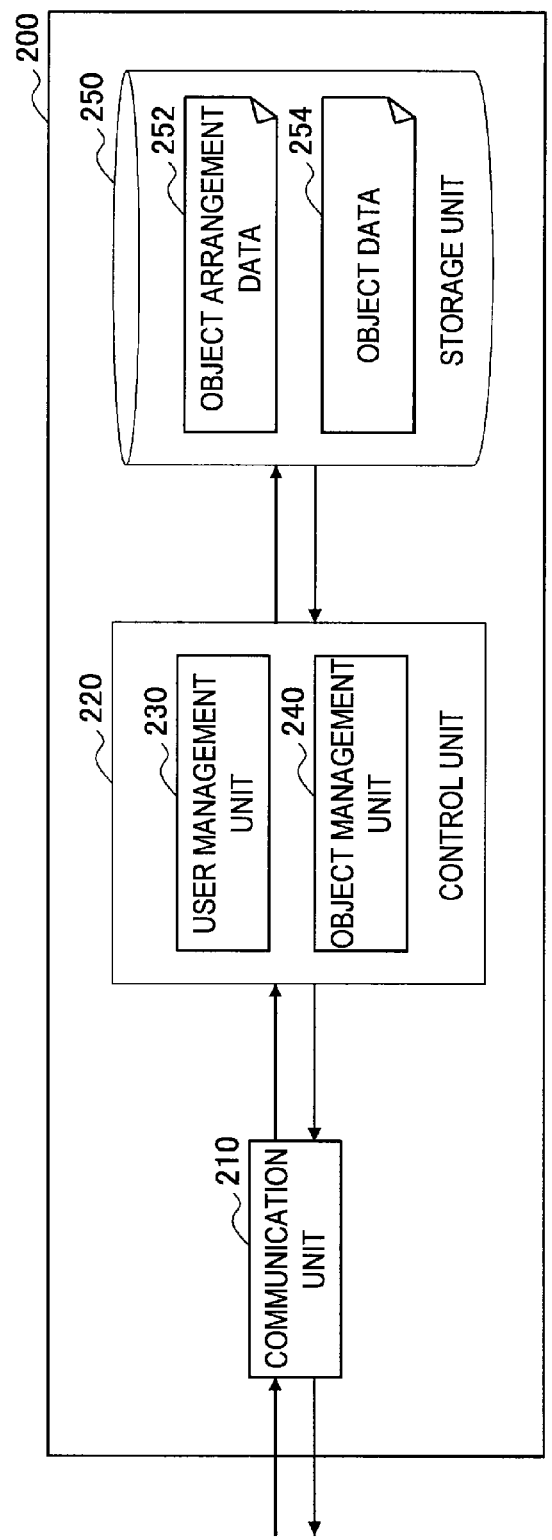
FIG. 22 is a block diagram showing an exemplary configuration of a management server according to the second embodiment.

FIG. 22 is a block diagram showing an exemplary configuration of the management server 200. Referring to FIG. 22, the management server 200 includes a communication unit 210, a control unit 220, and a storage unit 250.

The communication unit 210 is a communication interface that intermediates the communication of the management server 200 with another device. The communication unit 210 is a communication interface that supports a given wireless communication protocol or wire communication protocol, and establishes communication connection with another device.

The control unit 220 corresponds to a processor such as a CPU or a DSP. The control unit 220 operates the function of the management server 200 by executing a program stored in the storage unit 250 or another storage medium. The user management unit 230 and the object management unit 240 are exemplary function modules of the management server 200.

The user management unit 230 is a function module that manages a user who participates in sharing a virtual object. The user management unit 230 controls, for example, authentication of a user, grouping of users, provision of user information to the terminal device 300, and the like.

The object management unit 240 is a function module that manages data on a shared virtual object. The object management unit 240, for example, receives a data registration request from a terminal device 300, which has arranged a virtual object in the reference environment, via the communication unit 210. The data registration request includes object arrangement data on a virtual object to be shared. The object management unit 240 may also receive from the terminal device 300 object data indicating the shape of a virtual object and information indicated by the virtual object. The object management unit 240, in response to reception of such data registration request, stores the object arrangement data and the object data into the storage unit 250. In addition, the object management unit 240, in response to a data distribution request from the terminal device 300 or periodically, distributes the registered object arrangement data (and object data) to the terminal device 300 via the communication unit 210.

The storage unit 250 includes a storage medium such as semiconductor memory or a hard disk, and stores a program and data for processes to be performed by the management server 200. The data stored in the storage unit 250 includes object arrangement data 252 and object data 254.

FIG. 23 shows an example of the object arrangement data 252. In the example in FIG. 23, the object arrangement data 252 includes four data items of "reference environment," "object ID," "creator ID," and "arrangement." The "reference environment" is an identifier that identifies an environment in which each virtual object is arranged. The "object ID" is an identifier for uniquely identifying each virtual object. The "creator ID" is an identifier for identifying a device or a user who has arranged each virtual object. The "arrangement" is the data item for storing an object arrangement matrix of each virtual object.

FIG. 24 shows an example of the object data 254. In the example in FIG. 24, the object data 254 includes five data items of "object ID," "display attribute data," "user data," "status," and "device data." The "object ID" is an identifier for uniquely identifying each virtual object. The "display attribute data" is data that defines the display attributes of each virtual object, and is used to display the virtual object at the terminal device 300. The "user data," "status," and "device data" are examples of associated information associated with a terminal that has arranged each virtual object. For example, the "user data" can include identification information, name, facial photograph, or the like of a user of the terminal. The "status" can include presence information of a user of the terminal, operation status information, or the like. The "device data" can include identification information, name, external appearance data, or the like of the terminal.

The object management unit 240 may distribute at least a part of the associated information exemplarily shown in FIG. 24 to the terminal device 300, and display the distributed associated information on the terminal device 300 together with a virtual object.

3-3. Configuration of Terminal

Figure 25:
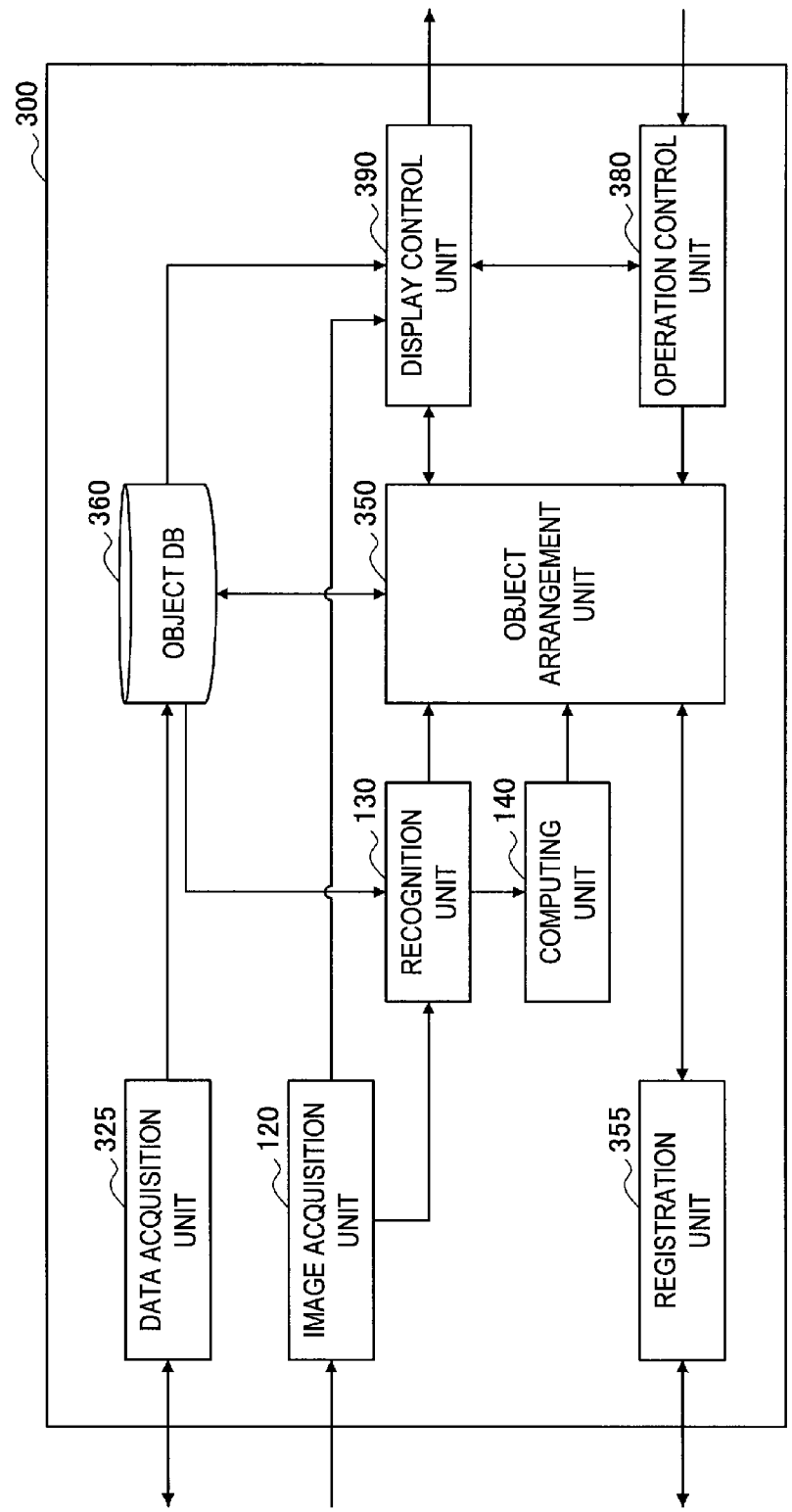
FIG. 25 is a block diagram showing an exemplary configuration of a terminal device according to the second embodiment.

The hardware configuration of the terminal device 300 may be similar to the hardware configuration of the image processing device 100 exemplarily shown in FIG. 9. FIG. 25 is a block diagram showing an exemplary configuration of the logical function of the terminal device 300. Referring to FIG. 25, the terminal device 300 includes an image acquiring unit 120, a data acquisition unit 325, a recognition unit 130, a computing unit 140, an object arrangement unit 350, a registration unit 355, an object DB 360, an operation control unit 380, and a display control unit 390.

(1) Data Acquisition Unit

The data acquisition unit 325 transmits a data distribution request to the management server 200 periodically or in response to an instruction from a user. Then, the data acquisition unit 325 acquires object arrangement data and object data on a virtual object to be shared with another terminal.

The object arrangement data acquired by the data acquisition unit 325 includes an object arrangement matrix of a virtual object arranged by another terminal. The object arrangement matrix is a matrix determined on the basis of an inverse matrix of an environment recognition matrix recognized by another terminal, and represents the position and the attitude of a virtual object arranged by the other terminal in the reference environment. In addition, the object data acquired by the data acquisition unit 325 includes associated information such as the one exemplarily shown in FIG. 24 that is associated with the terminal that has arranged the virtual object. The data acquisition unit 325 stores the object arrangement data and the object data in the object DB 360.

(2) Object Arrangement Unit

The object arrangement unit 350, like the object arrangement unit 150 of the image processing device 100, arranges a virtual object, which has a position and an attitude based on an inverse matrix of an environment recognition matrix recognized by the recognition unit 130, in the reference environment. The position and the attitude of the arranged virtual object are represented by an object arrangement matrix.

The object arrangement unit 350 may arrange a virtual object, for example, at a position and an attitude represented by the inverse matrix $M_{recog}^{-1}$ of the environment recognition matrix so that the position and the attitude of the virtual object overlap the position and the attitude of the terminal. Alternatively, the object arrangement unit 350 may arrange a virtual object at a position that is offset from the position and the attitude of the terminal using one or both of the aforementioned front offset matrix and the operational offset matrix.

The object arrangement unit 350 outputs the object arrangement matrix of the virtual object arranged in the reference environment to the display control unit 390. In addition, the object arrangement unit 350, when the operation control unit 380 detects a predetermined user input, stores the object arrangement matrix in the object DB 360 in association with the reference environment and outputs it to the registration unit 355.

(3) Registration Unit

The registration unit 355, upon receiving an object arrangement matrix from the object arrangement unit 350, transmits a data registration request to the management server 200 via the communication unit 112. The data registration request may include, together with the object arrangement matrix, display attribute data that defines the display attributes of the virtual object and the aforementioned various associated information.

(4) Object DB

The object DB 360 is, like the object DB 160 of the image processing device 100, a database that stores an object arrangement matrix of a virtual object arranged by the object arrangement unit 350. Further, the object DB 360 stores object arrangement data and object data received from the management server 200 by the data acquisition unit 325. The data stored in the object DB 360 is read when the display control unit 390 executes a process of displaying a virtual object.

(5) Operation Control Unit

The operation control unit 380, like the operation control unit 180 of the image processing device 100, provides a user interface for allowing a user to operate an AR application executed by the terminal device 300. For example, the operation control unit 380 allows a user to freely adjust the arrangement of a virtual object to a desired position and attitude through a series of operations from a start to an end of touch or drag. The operation control unit 380, upon detecting a user input, outputs input information indicating the type of the detected user input and the input position to the object arrangement unit 350.

(6) Display Control Unit

The display control unit 390 generates an output image by overlaying a virtual object on an input image according to the object arrangement data stored in the object DB 360. Then, the display control unit 390 displays the generated output image on the screen of the display unit 110.

Virtual objects displayed in this embodiment include a virtual object arranged in the reference environment by another terminal. The virtual object arranged in the reference environment by another device has an object arrangement matrix that is determined on the basis of an inverse matrix of a first environment recognition matrix representing the position and the attitude of the reference environment that appears in the input image of the other terminal. Meanwhile, the recognition unit 130 recognizes a second environment recognition matrix representing the position and the attitude of the reference environment that appears in an input image acquired by the image acquisition unit 130. In this case, the display control unit 390 overlays the virtual object on the input image at a position and an attitude represented by the second environment recognition matrix and the object arrangement matrix of the virtual object arranged by another terminal, according to a method described with reference to FIG. 8.

Like the display control unit 190 according to the first embodiment, the display control unit 390 may, when a virtual object has a reference plane, change the display of the virtual object according to whether the reference plane of the virtual object appears in the screen of the image processing device 100 or not. In addition, the display control unit 390 may change the display of the virtual object according to the distance between the terminal device 300 and the virtual object. Further, the display control unit 390 may, when a predetermined condition is satisfied, re-arrange a plurality of virtual objects to be displayed so that the virtual objects are aligned with a predetermined space therebetween.

In addition, in this embodiment, the display control unit 390 may change the display of a virtual object according to whether a terminal, which has arranged the virtual object, is located at a position corresponding to the virtual object or not.

For example, suppose that a virtual object that serves as an indication for identifying a terminal in the image is used. When a terminal, which has arranged a virtual object, exists around the arranged virtual object, the terminal can be viewed in the real space. Thus, detailed information (e.g., user data, status, and device data) on the terminal (or its user) need not necessarily be displayed. In contrast, when a terminal, which has arranged a virtual object, does not exist around the arranged virtual object, it would be advantageous if more detailed information on the terminal (or its user) is displayed.

Figure 26:
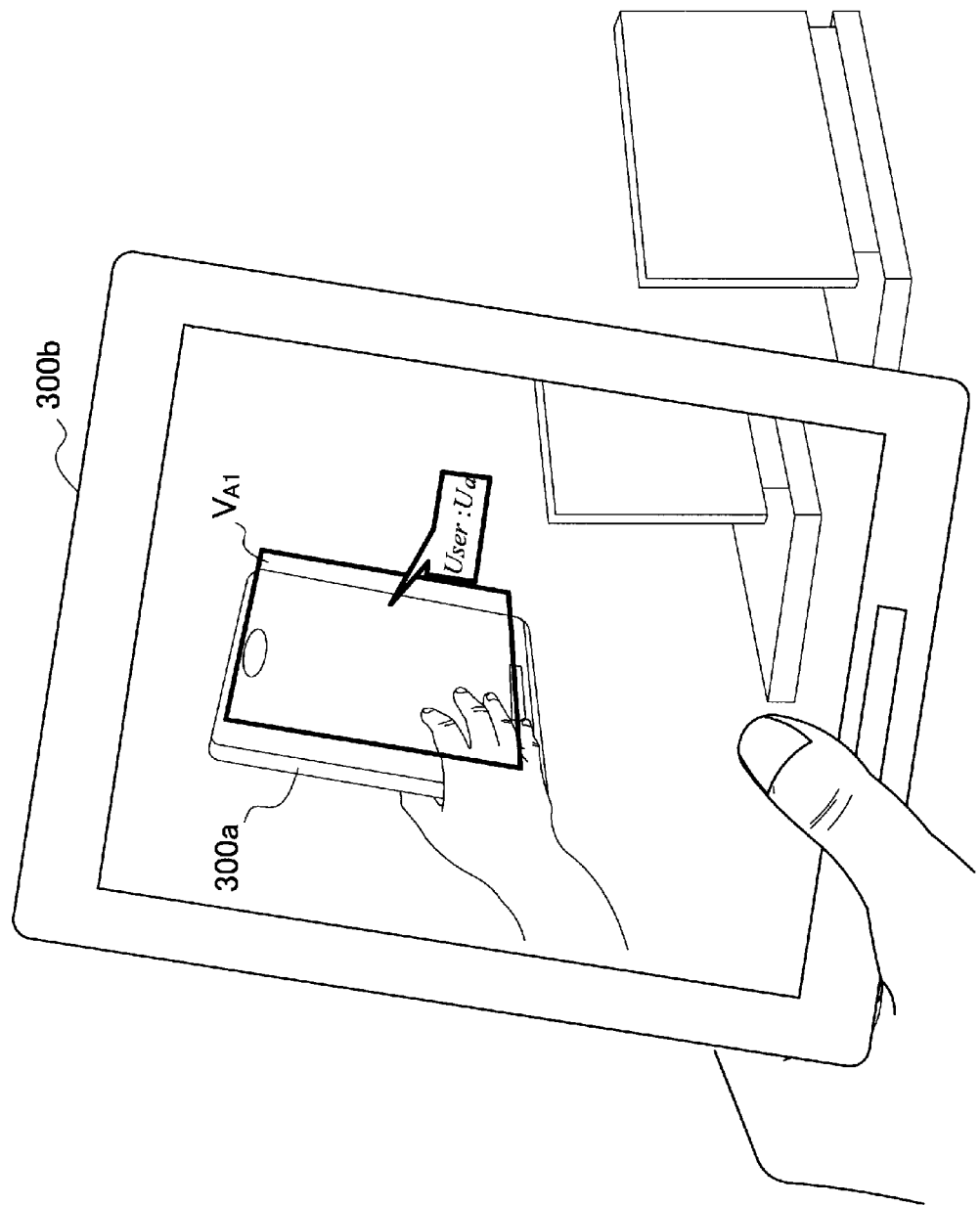
FIG. 26 is an explanatory diagram showing a first example of display of a virtual object according to the second embodiment.

Referring to FIG. 26, a virtual object $V_{A1}$ arranged by a terminal device 300a is displayed on a screen of a terminal device 300b. The terminal device 300a exists around the virtual object $V_{A1}$. Under such circumstances, the display control unit 390 adds only simple information (user ID "Ua" in the example in FIG. 26) about the user of the terminal device 300a to the virtual object $V_{A1}$.

Figure 27:
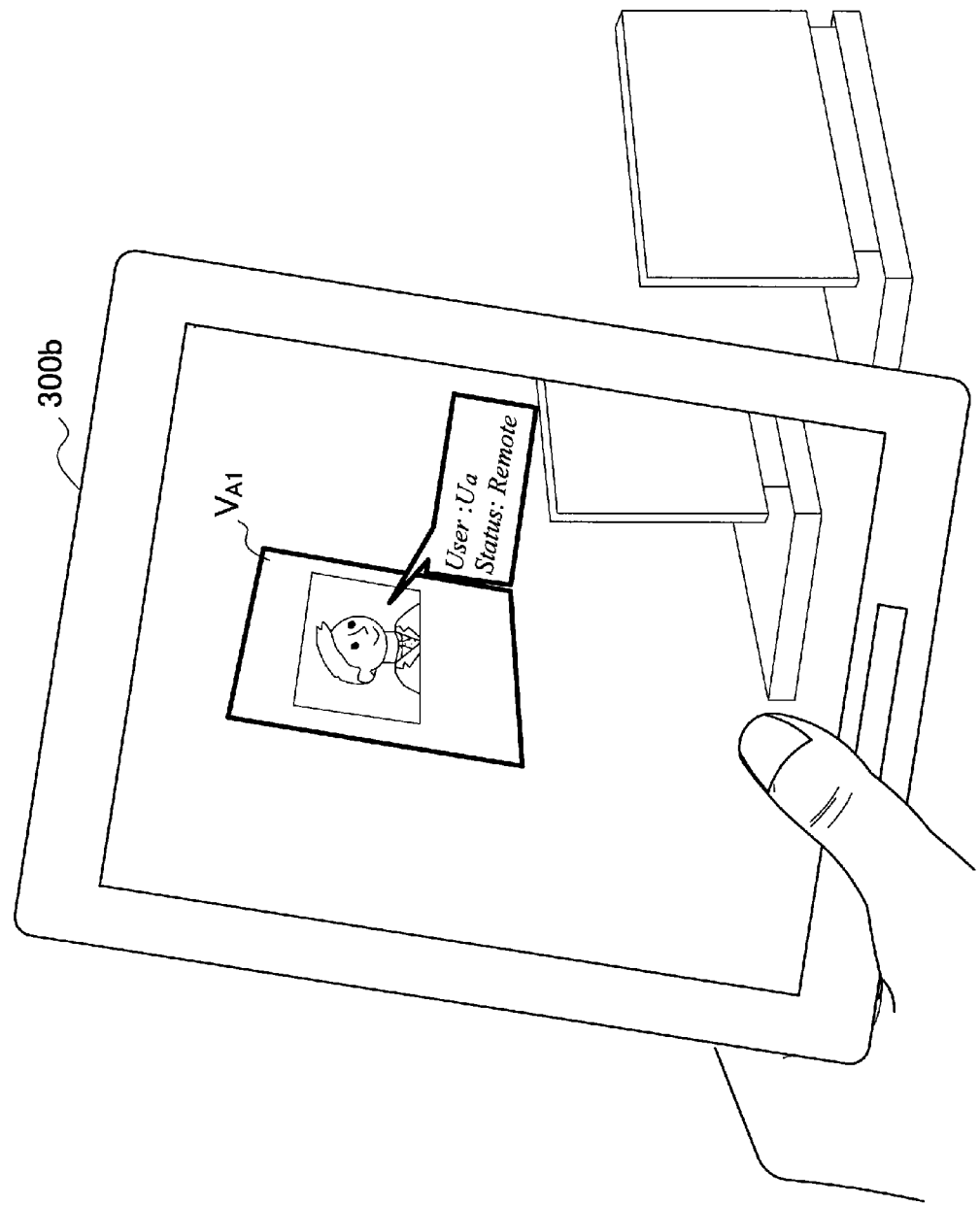
FIG. 27 is an explanatory diagram showing a second example of display of a virtual object according to the second embodiment.

Meanwhile, referring to FIG. 27, a virtual object $V_{A1}$ arranged by the terminal device 300a is displayed again on the screen of the terminal device 300b. The terminal device 300a does not exist around the virtual object $V_{A1}$. The terminal device 300a may exist in a space different from (but a space having a common reference environment to) the terminal device 300b or the terminal device 300a may be the one that has existed in the same space as the terminal device 300b in the past. In such a circumstance, the display control unit 390 adds detailed information about the user of the terminal device 300a (user IR, space, and face photograph in the example in FIG. 27) to the virtual object $V_{A1}$. Accordingly, the user of the terminal device 300b is able to know the details of the user of the terminal device 300a that is not visible.

Figure 28:
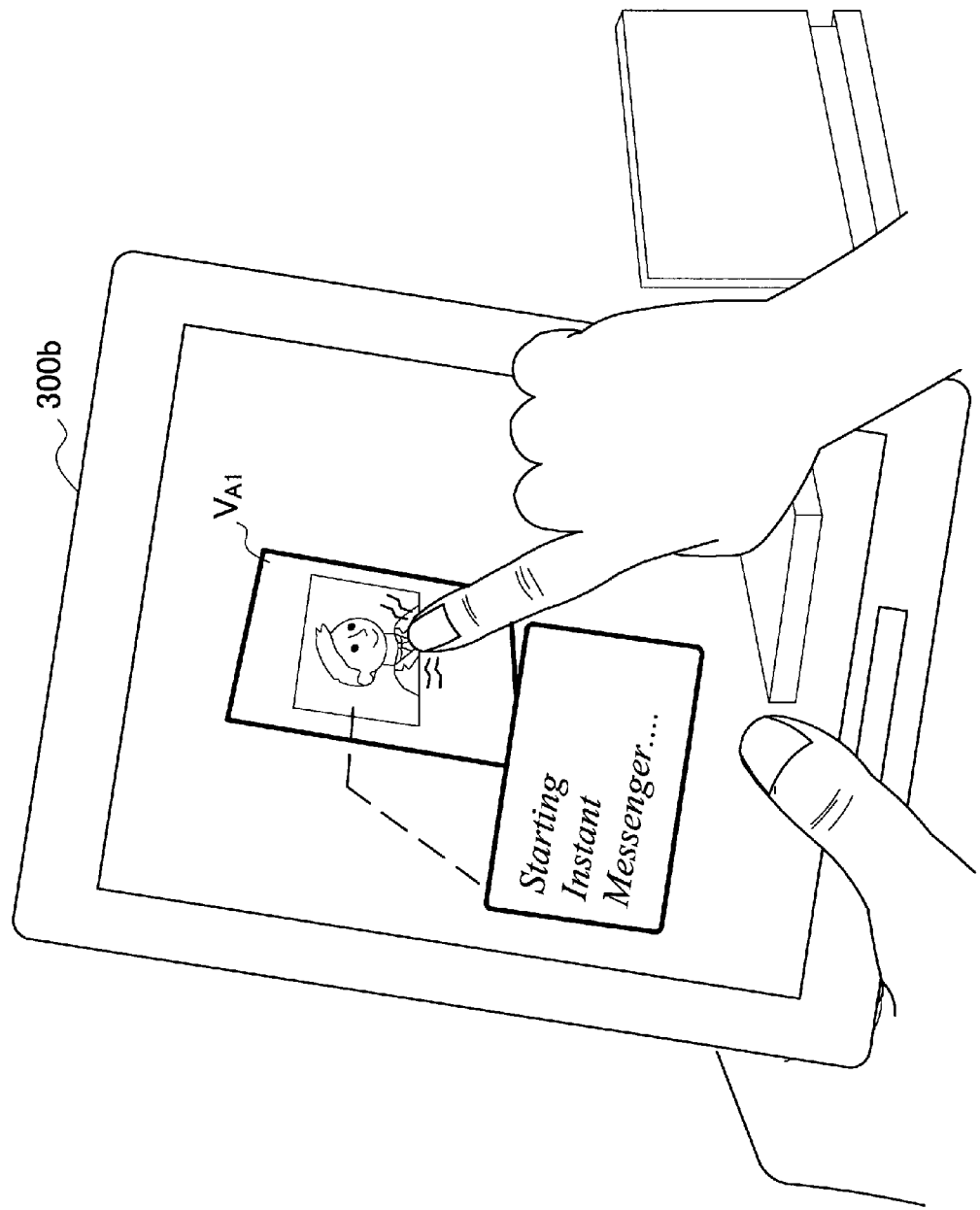
FIG. 28 is an explanatory diagram showing start-up of a communication application according to the second embodiment.

The display control unit 390 may, upon detecting a user input that designates a virtual object such as the one exemplarily shown in FIG. 26 or FIG. 27, start an application that uses communication with a terminal that has arranged the virtual object. The application started herein may be any application such as a mailer, an instant messenger, a social media tool, or a content sharing application. In the example in FIG. 28, when a user of the terminal device 300b taps the virtual object $V_{A1}$, an instant messenger is started to start communication with the terminal device 300a. According to such a configuration, it is possible to easily perform communication between users via a virtual object.

3-4. Process Flow

Figure 29:
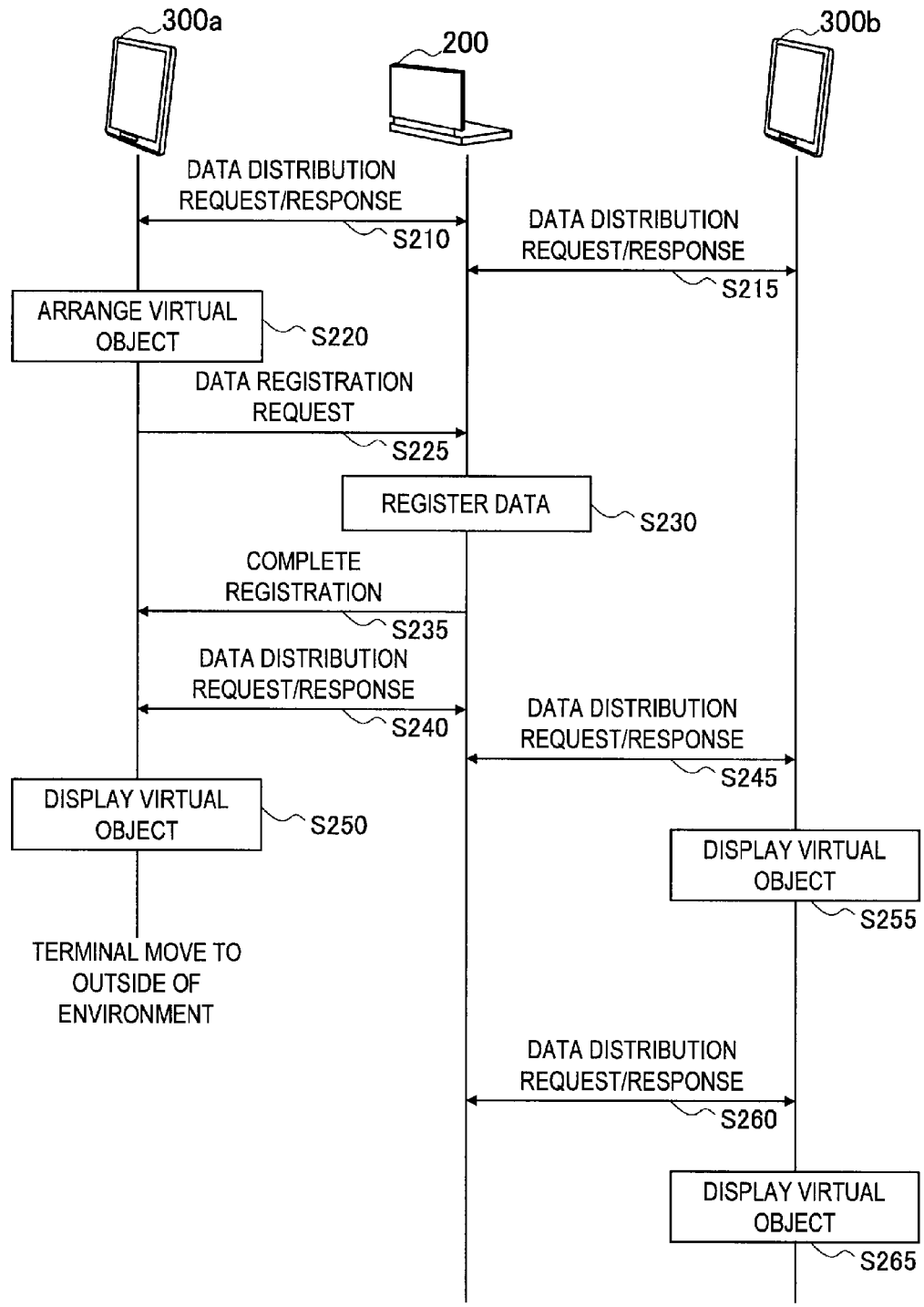
FIG. 29 is a sequential diagram showing an exemplary flow of a process performed between devices according to the second embodiment.

FIG. 29 is a sequential diagram showing an exemplary flow of a process performed between devices according to the second embodiment.

Referring to FIG. 29, first, a data distribution request is transmitted from the terminal device 300a to the management server 200, and a response is returned from the management server 200 (step S210). At this point in time, no virtual object is arranged in the reference environment. Thus, the terminal device 300a does not receive object arrangement data. Likewise, a data distribution request is transmitted from the terminal device 300b to the management server 200, and a response is returned from the management server 200 (step S215).

Next, a virtual object is arranged in the reference environment by the terminal device 300a through image processing described with reference to FIGS. 14 and 15 (step S220). Then, the terminal device 300a transmits a data registration request to the management server 200 (step S225). The data registration request includes an object arrangement matrix of the arranged virtual object.

The management server 200, upon receiving the data registration request, registers the object arrangement matrix and other data in the database (step S230). Then, the management server 200 informs the terminal device 300a of the completion of the registration (step S235).

After that, a data distribution request is transmitted again from the terminal device 300a to the management server 200, and a response is returned from the management server 200 (step S240). In addition, a data distribution request is also transmitted from the terminal device 300b to the management server 200, and a response is retuned from the management server 200 (step S245). At this point in time, the virtual object arranged by the terminal device 300a is registered in the database of the management server 200. Thus, object arrangement data can be distributed from the management server 200 to the terminal device 300b.

The virtual object arranged by the terminal device 300a is displayed on the terminal device 300a (step S250). In addition, the virtual object is also displayed on the terminal device 300b using the object arrangement data received from the management server 200 (step S255). At this point in time, the terminal device 300a exists around the displayed virtual object. Thus, only simple information can be added to the virtual object at the terminal device 300b.

After that, assume that the terminal device 300a has moved to a place outside of the screen of the terminal device 300b. The terminal device 300b continuously communicates with the management server 200 (step S260) and displays a virtual object (step S265). At this point in time, the terminal device 300a does not exist around the displayed virtual object. Thus, detailed information on the terminal device 300a can be added to the virtual object at the terminal device 300b.

4. CONCLUSION

Heretofore, two embodiments of the technology according to the present disclosure have been described in detail. According to such an embodiment, an environment recognition matrix that represents the position and the attitude of the reference environment with reference to the position and the attitude of the terminal in the reference environment is recognized, and a virtual object is arranged in the reference environment at a position and an attitude that are based on an inverse matrix of the recognized environment recognition matrix. Thus, the user is able to easily and freely arrange a virtual object in the AR space by moving the terminal in the three-dimensional space. In addition, as the arrangement of a virtual object is associated with the reference environment, the virtual object arranged in the AR space can be easily shared between terminals that can recognize a common environment.

In addition, when the arrangement of the virtual object is offset in the imaging direction of the image from the position represented by the inverse matrix of the environment recognition matrix, the user is able to quickly recognize the arranged virtual object on the screen. Accordingly, the user is able to adjust the arrangement of the virtual object while viewing the virtual object.

In addition, when the arrangement of the virtual object is offset in the direction along the screen from the position represented by the inverse matrix of the environment recognition matrix according to a user input position on the screen, it is possible to finely adjust the arrangement of the virtual object without moving the terminal.

Arrangement of a virtual object is represented by an object arrangement matrix, and the virtual object can be displayed on a screen at a position and an attitude represented by the object arrangement matrix and the latest environment recognition matrix. Accordingly, even when a positional relationship between the terminal and the reference environment changes, the virtual object can be displayed so that the relative position and attitude of the virtual object with respect to the reference environment is maintained. Thus, arrangement of a virtual object that is like attaching the virtual object to the AR space like a sticky becomes possible.

Note that a series of control processes performed by each device described in this specification can be implemented using any of software, hardware, or a combination thereof. A program that constitutes software is stored in advance in a storage medium that is provided in or outside each device. Then, each program is, for example, read into RAM (Random Access Memory) in execution and executed by a processor like a CPU.

In addition, a part of the logical function of each device may be, instead of being implemented on the device, implemented on a device that exists in a cloud computing environment, with assets at a remote location. In such a case, information exchanged between the logical functions is transmitted or received between the devices via the communication unit 112 exemplarily shown in FIG. 9.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

Additionally, the present technology may also be configured as below.

An information processing apparatus having
a control unit having circuitry configured to
receive an indication of a detected posture of the information processing apparatus, and
attach a virtual object to a reference environment with a posture related to the detected posture of the information processing apparatus.

The information processing apparatus may also include
a display control unit configured to change display attributes of the virtual object according to a distance from the virtual object to the image processing apparatus.

An aspect of the information processing apparatus is that the display control unit emphasizes a display attribute to a greater extent when the distance is shorter than a predetermined longer distance.

The information processing apparatus may also include
a display control unit that rearranges a display of the virtual object with another virtual object so a predetermined display space is set therebetween, said display control unit rearranges the display in response to a predetermined condition being satisfied.

The information processing apparatus may also include
an object arrangement unit that is configured to sequentially store object arrangement matrices of the virtual object for a plurality of images with respect to the reference environment.

An aspect of the information processing apparatus is that the control unit generates a track of the virtual object or an animation of the virtual object as moving along a track of the image processing device when moving.

The information processing apparatus may also include
a communications interface that provides information of the virtual object in association with the reference environment to an object management unit that registers the information of the virtual object.

An aspect of the information processing apparatus is that said communications interface sends said information to the object management unit that is implemented as a cloud resource at a remote location.

An aspect of the information processing apparatus is that said information of the virtual object is available for retrieval with another information processing apparatus so the another information processing apparatus can share the virtual object and display the virtual object when the another information processing apparatus views the reference environment in with the virtual object is attached.

The information processing apparatus may also include
a display controller that causes a user ID to be displayed in association with another information processing device within the reference environment.

The information processing apparatus may also include
a display controller that causes a user ID of another information processing device that is not currently present in the reference environment to be displayed in association with the reference environment.

An aspect of the information processing apparatus is that the another information processing device was located in the reference environment in the past or remotely viewing the reference environment from a location outside the reference environment.

An aspect of the information processing apparatus is that the user ID includes personal information about a user associated with the user ID.

The information processing apparatus may also include
a communications interface through which social media communications with a user associated with the user ID is shared.

The information processing apparatus may also include
a user interface having a touch operation that is configured to trigger the control unit to attach the virtual object in response to the touch operation.

The information processing apparatus may also include
a user interface having a tap and hold operation that is configured to trigger the control unit to move the virtual object in the reference environment in response to the tap and hold operation.

The information processing apparatus may also include
a recognition unit that detects the detected posture based on image recognition, said detected posture being based on a reference plane that is part of a real object.

An aspect of the information processing apparatus is that the control unit arranges the virtual object so the virtual object is overlaid on a position and attitude of the information processing apparatus at a predetermined position.

The information processing apparatus may also include a display screen; and an object arrangement unit that arranges the virtual object at a position offset in a direction along the display screen according to a user specified input position on the display screen.

The information processing apparatus may also include a communication interface that receives from a remote device an indication of a detected posture of the remote device and a virtual object provided by the remote device; and circuitry configured to attach the virtual object to a reference environment of the remote device with a posture related to the detected posture of the remote device.

A non-transitory computer readable medium having computer readable instructions that when executed by processing circuitry performs a method, the method includes receiving an indication of a detected posture of an information processing apparatus; and attaching a virtual object to a reference environment with a posture related to the detected posture of the information processing apparatus.

A non-transitory computer readable medium having computer readable instructions that when executed by processing circuitry performs a method, said method includes receiving from a remote device an indication of a detected posture of the remote device and a virtual object provided by the remote device; and attaching with circuitry the virtual object to a reference environment of the remote device with a posture related to the detected posture of the remote device.

An image processing device including a recognition unit configured to recognize an environment recognition matrix representing, with respect to a position and an attitude of a terminal that has captured an image, a position and an attitude of an environment that appears in the image;

a computing unit configured to compute an inverse matrix of the environment recognition matrix; and an object arrangement unit configured to arrange in the environment a virtual object having a position and an attitude that are based on the inverse matrix of the environment recognition matrix.

An aspect of the information processing apparatus is that the object arrangement unit stores an object arrangement matrix representing the position and the attitude of the arranged virtual object in a storage medium in association with the environment.

An aspect of the information processing apparatus is that the object arrangement unit arranges the virtual object at a position offset in an imaging direction of the image from a position represented by the inverse matrix of the environment recognition matrix.

The information processing apparatus may also include a display control unit configured to, when the object arrangement matrix is stored at a first point in time and the environment recognition matrix is newly recognized at a second point in time that follows the first point in time, display the virtual object on a screen of the terminal at a position and an attitude represented by the object arrangement matrix and the newly recognized environment recognition matrix.

An aspect of the information processing apparatus is that the object arrangement unit arranges the virtual object at a position offset in a direction along a screen of the terminal according to a user input position on the screen.

An aspect of the information processing apparatus is that the display control unit, when a first user input is detected, displays the virtual object on the screen of the terminal, and the object arrangement unit, when a second user input that follows the first user input is detected, stores the object arrangement matrix of the virtual object displayed by the display control unit in a storage medium in association with the environment.

An aspect of the information processing apparatus is that the first user input and the second user input correspond to a start and an end of a series of operations, respectively.

An aspect of the information processing apparatus is that the display control unit controls display of the virtual object so that a relative position and attitude of the virtual object with respect to the terminal at a point in time when the first user input is detected is maintained during a period after the first user input is detected until the second user input is detected.

An aspect of the information processing apparatus is that the object arrangement unit, when a new environment is recognized from an image at a point in time when the second user input is detected, stores a new object arrangement matrix representing a position and an attitude of the displayed virtual object in a storage medium in association with the environment.

An aspect of the information processing apparatus is that the object arrangement unit, when a third user input is detected, sequentially stores object arrangement matrices for a plurality of images in a storage medium in association with the environment.

An aspect of the information processing apparatus is that the display control unit displays a track of the virtual object in the environment using the consecutively stored object arrangement matrices.

An aspect of the information processing apparatus is that the display control unit displays an animation in which the virtual object moves in the environment, using the consecutively stored object arrangement matrices.

An aspect of the information processing apparatus is that the display control unit, from the object arrangement matrices stored in different points in time, interpolates a position and an attitude of the virtual object between the different points in time.

An aspect of the information processing apparatus is that the terminal is an imaging device, the virtual object is arranged in the environment to record an imaging position and an imaging attitude of the image.

An aspect of the information processing apparatus is that the object arrangement unit, when a fourth user input corresponding to an instruction to capture an image is detected, stores the object arrangement matrix in a storage medium.

An aspect of the information processing apparatus is that the virtual object has a predefined reference plane, and the display control unit changes a display of the virtual object according to whether the reference plane of the virtual object appears in the screen of the terminal or not.

An aspect of the information processing apparatus is that the display control unit changes a display of the virtual object according to a distance between the terminal and the virtual object.

An aspect of the information processing apparatus is that the display control unit, when a plurality of virtual objects each having an object arrangement matrix exist, re-arranges the plurality of virtual objects so that the virtual objects are aligned with a predetermined space therebetween if a predetermined condition is satisfied.

An aspect of the information processing apparatus is that at least one of the recognition unit, the computing unit, or the object arrangement unit is implemented by a device that exists on a cloud computing environment instead of the image processing device.

An image processing method, including recognizing an environment recognition matrix representing, with respect to a position and an attitude of a terminal that has captured an image, a position and an attitude of an environment that appears in the image;

computing an inverse matrix of the environment recognition matrix; and arranging in the environment a virtual object having a position and an attitude that are based on the inverse matrix of the environment recognition matrix.

A program causing a computer to function as a recognition unit configured to recognize an environment recognition matrix representing, with respect to a position and an attitude of a terminal that has captured an image, a position and an attitude of an environment that appears in the image;

a computing unit configured to compute an inverse matrix of the environment recognition matrix; and an object arrangement unit configured to arrange in the environment a virtual object having a position and an attitude that are based on the inverse matrix of the environment recognition matrix.

REFERENCE SIGNS LIST 100, 300 Image processing device (Terminal device)
120 Image acquisition unit
325 Data acquisition unit
130 Recognition unit
140 Computing unit
150, 350 Object arrangement unit
355 Registration unit
180, 380 Operation control unit
190, 390 Display control unit

The invention claimed is:

1. An information processing apparatus comprising:
circuitry configured to
detect a first orientation of the information processing apparatus with respect to a reference environment, wherein the first orientation includes a position and a tilted attitude of the information processing apparatus,
attach a virtual object to the reference environment, the virtual object having an initial posture that is computed based on the detected first orientation of the information processing apparatus, and an offset of the virtual object with respect to the information processing apparatus,
display the virtual object on a display panel, the virtual object being displayed with the initial posture at a location determined by a touch operation on the display panel,
update the initial posture of the virtual object based on a change in the reference environment, the updated posture being computed based on the initial posture of the virtual object and a second orientation of the changed reference environment with respect to the information processing device, and
update the display of the virtual object corresponding to the change in the reference environment, the update being performed upon detection of a continuous touch operation on the display panel.

2. The information processing apparatus of claim 1, wherein the circuitry is further configured to:
display a plurality of virtual objects on the display panel of the information processing apparatus, and
emphasize a display attribute of each displayed virtual object based on a distance of the virtual object from the information processing apparatus.

3. The information processing apparatus of claim 2, wherein the circuitry is further configured to:
re-arrange the display of the plurality of virtual objects on the display panel of the information processing apparatus based on a predetermined condition being satisfied, the re-arranged display having a predetermined display space being set between the displayed virtual objects.

4. The information processing apparatus of claim 3, wherein the predetermined condition is a number of virtual objects being displayed on the display panel of the information processing apparatus exceeding a predetermined threshold value.

5. The information processing apparatus of claim 1, wherein the circuitry is further configured to sequentially store, for each virtual object, arrangement matrices corresponding to a plurality of images captured by the information processing apparatus with respect to the reference environment.

6. The information processing apparatus of claim 5, wherein the circuitry is further configured to:
generate a track of the virtual object, the track indicating a sequence of orientations of the virtual object in a predetermined amount to time, and
display an animation of the virtual object based on the generated track.

7. The information processing apparatus of claim 6, wherein the circuitry is further configured to generate the track of the virtual object by overlaying the sequence of orientations of the virtual object on a single image based on the stored arrangement matrices.

8. The information processing apparatus of claim 1, wherein the circuitry is further configured to provide, via a communication interface, information of the virtual object in association with the reference environment to a management server that registers the information of the virtual object.

9. The information processing apparatus of claim 8, wherein the object management server is implemented as a cloud resource at a remote location.

10. The information processing apparatus of claim 8, wherein the information of the virtual object is available for retrieval by another information processing apparatus to share the virtual object, and display the virtual object when the another information processing apparatus views the reference environment in which the virtual object is attached.

11. The information processing apparatus of claim 1, wherein the circuitry is further configured to display a user ID in association with another information processing device within the reference environment.

12. The information processing apparatus of claim 1, wherein the circuitry is further configured to display, in association with the reference environment, a user ID of another information processing device that is not currently present in the reference environment.

13. The information processing apparatus of claim 12, wherein the another information processing device is located in the reference at a time instant prior to a time corresponding to the location of the information processing apparatus in the reference environment.

14. The information processing apparatus of claim 13, wherein the another information processing apparatus views the reference environment from a location outside the reference environment.

15. The information processing apparatus of claim 1, wherein the circuitry is further configured to trigger the attaching of the virtual object in the reference environment, and displaying the virtual object on the display panel of the information processing apparatus in response to detecting the touch operation.

16. The information processing apparatus of claim 1, wherein the circuitry is further configured to detect the initial posture of the virtual object based on image recognition, the detected posture being based on a reference plane that is part of a corresponding real object.

17. An information processing apparatus comprising:
a communication interface configured to receive from a remote device, a detected first orientation of the remote device with respect to a reference environment, and a virtual object provided by the remote device, wherein the first orientation includes a position and a tilted attitude of the remote device; and
circuitry configured to
attach the virtual object to the reference environment of the remote device, the virtual object having an initial posture that is computed based on the detected first orientation of the remote device, and an offset of the virtual object with respect to the remote device,
display the virtual object on a display panel, the virtual object being displayed with the initial posture at a location determined by a touch operation on the display panel,
update the initial posture of the virtual object based on a change in the reference environment, the updated posture being computed based on the initial posture of the virtual object and a second orientation of the changed reference environment with respect to the remote device, and
update the display of the virtual object corresponding to the change in the reference environment, the update being performed upon detection of a continuous touch operation on the display panel.

18. A non-transitory computer readable medium having computer readable instructions that when executed by the computer, causes the computer to perform a method comprising:
detecting a first orientation of an information processing apparatus with respect to a reference environment, wherein the first orientation includes a position and a tilted attitude of the information processing apparatus;
attaching a virtual object to the reference environment, the virtual object having an initial posture that is computed based on the detected first orientation of the information processing apparatus, and an offset of the virtual object with respect to the information processing apparatus;
displaying the virtual object on a display panel, the virtual object being displayed with the initial posture at a location determined by a touch operation on the display panel,
updating the initial posture of the virtual object based on a change in the reference environment, the updated posture being computed based on the initial posture of the virtual object and a second orientation of the changed reference environment with respect to the information processing device; and
updating the display of the virtual object corresponding to the change in the reference environment, the update being performed upon detection of a continuous touch operation on the display panel.

19. A non-transitory computer readable medium having computer readable instructions that when executed by a computer, causes the computer to perform a method comprising:
receiving from a remote device, a detected first orientation of the remote device with respect to a reference environment, and a virtual object provided by the remote device, wherein the first orientation includes a position and a tilted attitude of the remote device;
attaching the virtual object to the reference environment of the remote device, the virtual object having an initial posture that is computed based on the detected first orientation of the remote device, and an offset of the virtual object with respect to the remote device;
displaying the virtual object on a display panel, the virtual object being displayed with the initial posture at a location determined by a touch operation on the display panel;
updating the initial posture of the virtual object based on a change in the reference environment, the updated posture being computed based on the initial posture of the virtual object and a second orientation of the changed reference environment with respect to the remote device; and
updating the display of the virtual object corresponding to the change in the reference environment, the update being performed upon detection of a continuous touch operation on the display panel.

* * * * *

UNITED STATES PATENT AND TRADEMARK OFFICE
CERTIFICATE OF CORRECTION

PATENT NO. : 9,639,988 B2  
APPLICATION NO. : 14/353379  
DATED : May 2, 2017  
INVENTOR(S) : Shunichi Kasahara Page 1 of 1

It is certified that error appears in the above-identified patent and that said Letters Patent is hereby corrected as shown below:

On the Title Page

Item (87), the PCT Publication Number Information is incorrect. Item (87) should read:
-- (87)   PCT Pub. No.: WO2013/118458
          PCT Pub. Date: Aug. 15, 2013 --

Signed and Sealed this  
Sixth Day of November, 2018

Andrei Iancu  
*Director of the United States Patent and Trademark Office*